US012627547B2

(12) United States Patent
Kim

(10) Patent No.: US 12,627,547 B2
(45) Date of Patent: May 12, 2026

(54) METHOD AND APPARATUS FOR DETECTING PREAMBLE SIGNAL OF RANDOM ACCESS CHANNEL IN BASE STATION OF WIRELESS COMMUNICATION SYSTEM

(71) Applicant: Samsung Electronics Co., Ltd., Suwon-si (KR)

(72) Inventor: Hyuncheol Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 554 days.

(21) Appl. No.: 18/170,961

(22) Filed: Feb. 17, 2023

(65) Prior Publication Data

US 2023/0269121 A1 Aug. 24, 2023

Related U.S. Application Data

(63) Continuation of application No. PCT/KR2023/002169, filed on Feb. 14, 2023.

(30) Foreign Application Priority Data

Feb. 18, 2022 (KR) ........................ 10-2022-0021653
Apr. 12, 2022 (KR) ........................ 10-2022-0045396

(51) Int. Cl.
*H04L 27/26* (2006.01)
*H04W 74/00* (2009.01)
*H04W 74/0833* (2024.01)

(52) U.S. Cl.
CPC ..... *H04L 27/26025* (2021.01); *H04W 74/004* (2013.01); *H04W 74/0833* (2013.01)

(58) Field of Classification Search
CPC ............... H04L 27/26025; H04L 27/26; H04L 27/2675; H04L 27/2686; H04L 27/2662;
(Continued)

(56) References Cited

U.S. PATENT DOCUMENTS 8,040,922 B2 10/2011 Wang et al.
8,165,103 B2 4/2012 Peters et al.
(Continued)

FOREIGN PATENT DOCUMENTS

CN 102523185 A 6/2012
CN 103038392 A 4/2013
(Continued)

OTHER PUBLICATIONS

Ericsson, "NR PRACH design", R1-1702127,3GPP TSG-RAN WG1 Meeting #8, Athens, Greece, Feb. 13-17, 2017 (Year: 2017).*
(Continued)

*Primary Examiner* — Moo Jeong
*Assistant Examiner* — David Zhijun Sun
(74) *Attorney, Agent, or Firm* — Jefferson IP Law, LLP

(57) ABSTRACT

A preamble reception apparatus and a reception method for extending a range of a base station are provided. The apparatus includes a preamble symbol unit data generator for receiving preamble symbols, a first fast Fourier transformer for fast Fourier transforming each output of the preamble symbol unit data generator, a first sequence generator for generating a preamble sequence, a coverage extension detector configured to calculate symbol power of each of the preamble symbols, calculate a non-coherent sum for each consecutive preamble symbol, combine the non-coherent sums, and detect a maximum energy value among the non-coherent sums and a first delay value (DF) of the preamble symbols having the maximum energy value, a delay ambiguity detector configured to calculate power for two consecutive preamble symbols, and estimate a second delay value (DT) of the preamble symbols, and a preamble determiner for determining whether a preamble is received.

18 Claims, 15 Drawing Sheets

(58) Field of Classification Search
CPC ... H04W 74/004; H04W 74/00; H04W 74/08; H04W 74/0833
See application file for complete search history.

(56) References Cited

U.S. PATENT DOCUMENTS

| | | | |
|---|---|---|---|
| 8,668,963 B2 | 3/2014 | Bedel et al. | |
| 8,868,061 B2 | 10/2014 | Zhang et al. | |
| 9,698,950 B2 | 7/2017 | Xu et al. | |
| 9,913,295 B2 | 3/2018 | Tavares et al. | |
| 10,104,695 B2 | 10/2018 | Yang et al. | |
| 2009/0191875 A1 | 7/2009 | Vujcic et al. | |
| 2019/0097856 A1 | 3/2019 | Kim et al. | |
| 2020/0092871 A1* | 3/2020 | Axnäs | H04W 74/0891 |
| 2021/0120593 A1* | 4/2021 | Carlsson | H04L 5/0023 |
| 2021/0392596 A1 | 12/2021 | Huang et al. | |

FOREIGN PATENT DOCUMENTS

| | | |
|---|---|---|
| CN | 113543351 A | 10/2021 |
| GB | 2562099 A | 11/2018 |
| KR | 10-2019-0035391 A | 4/2019 |
| KR | 10-2019-0049917 A | 5/2019 |
| KR | 10-2019-0068460 A | 6/2019 |
| WO | 2018/143892 A1 | 8/2018 |

OTHER PUBLICATIONS

International Search Report dated May 12, 2023, issued in International Patent Application No. PCT/KR2023/002169.

Mohammadi, Jafar et al. Blind Coherent Preamble Detection via Neural Networks, Sep. 30, 2021.

TCL; PRACH design Resolving Time Ambiguity and Increasing Capacity; 3GPP TSG RAN WG1 Meeting #89; R1-1708218, May 5, 2017.

Extended European Search Report dated Apr. 9, 2025, issued in a European Patent Application No. 23756609.6.

\* cited by examiner

METHOD AND APPARATUS FOR DETECTING PREAMBLE SIGNAL OF RANDOM ACCESS CHANNEL IN BASE STATION OF WIRELESS COMMUNICATION SYSTEM

CROSS-REFERENCE TO RELATED APPLICATION(S)

This application is a continuation application, claiming priority under § 365(c), of an International application No. PCT/KR2023/002169, filed on Feb. 14, 2023, which is based on and claims the benefit of a Korean patent application number 10-2022-0021653, filed on Feb. 18, 2022, in the Korean Intellectual Property Office, and of a Korean patent application number 10-2022-0045396, filed on Apr. 12, 2022, in the Korean Intellectual Property Office, the disclosure of each of which is incorporated by reference herein in its entirety.

TECHNICAL FIELD

The disclosure relates to a method and an apparatus for extending coverage of a random access channel in a wireless communication system. More particularly, the disclosure relates to a method and an apparatus for receiving a physical random access channel (PRACH) in a base station of a mobile communication system.

BACKGROUND ART

Typically, a wireless communication system may be implemented with a wireless transmitter and a wireless receiver. Further, when performing bidirectional communication, the wireless transmitter may incorporate the wireless receiver. For example, both a first device and a second device have to incorporate a wireless transmitter and a wireless receiver.

A common example of such a wireless communication system may be a mobile communication system according to the standard specification of $3^{rd}$ generation partnership project (3GPP). The mobile communication system may include a base station having a certain coverage area and at least one mobile communication terminal communicating within the coverage. In order for the base station and at least one mobile communication terminal to communicate with each other, it is first required a scheme for the mobile communication terminal to make connection with the base station.

A method proposed for a scheme for a mobile communication terminal to access a base station should essentially perform a procedure in which the mobile communication terminal accesses the base station using a physical random access channel (PRACH). As such, the base station may transmit a predetermined reference signal for the mobile communication terminal to make access, and the mobile communication terminal may perform a random access procedure based on the received reference signal.

Further, a mobile communication system of the related art has developed from a second generation communication system focusing on voice communication to a third generation (3G) communication system and a fourth generation (4G) communication system for data communication. According to this trend, a New Radio communication system, i.e., a fifth generation (5G) communication system, has been commercialized and used as a communication system capable of more various types of data communication.

Meanwhile, in a mobile communication system, a code division multiple access (CDMA) method and an orthogonal frequency-division multiple access (OFDMA) method are in use. Amongst them, the OFDMA method is mainly used in data communication in recent years, and it has been in wide use in communication technology based on the 3GPP standard.

Furthermore, as the mobile communication system develops with this trend, each mobile communication system uses a higher frequency band, and as the communication generation more progresses from the 3G communication system, the higher frequency band is used than the communication system of the related art. As described above, as the mobile communication systems developed later use a higher frequency band, there is a problem in that the distance and/or range through which a signal can be transmitted is narrowed according to the characteristics of radio waves. As a result, the base station has a problem that it may become more and more difficult to receive PRACH transmitted by the mobile communication terminal.

Reducing the coverage of the base station will require an additional burden of high cost on the part of a service provider providing the mobile communication service, which in turn leads to a burden on the user. For example, the number of base stations required further increases when the coverage of a base station has a radius of 5 km, compared to where the coverage of a base station has a radius of 10 km. Hence, if it is an urban area with many users, it may be necessary to increase the number of the base stations. However, there is an aspect that it is difficult to accommodate all the requirements where the density of population requiring communication is significantly low or irregular, such as in a rural area or a resort area with few users.

Therefore, although the service providers usually wish to take a wider coverage of the base station, the technical standard only proposes a scheme suitable for fairness based on both the densely populated area and the sparsely populated area. If the structure of PRACH itself is changed to address such a problem, modification should be made on the standard specification already established in the state of the art. However, this is not only technically difficult but also may cause lots of confusion. Therefore, there is a need for a method and apparatus for coverage extension to facilitate the use of PRACH for a mobile communication terminal to access a base station without changing the standard specification.

The above information is presented as background information only to assist with an understanding of the disclosure. No determination has been made, and no assertion is made, as to whether any of the above might be applicable as prior art with regard to the disclosure.

DISCLOSURE

Technical Problem

The disclosure provides a method and an apparatus for receiving a physical random access channel (PRACH) in a base station of a mobile communication system.

Further, the disclosure provides a method and an apparatus for extending coverage of a base station using a physical random access channel (PRACH) in a mobile communication system.

Furthermore, the disclosure provides a coverage extension method and apparatus for facilitating reception of a physical random access channel (PRACH) in a base station without changing a standard specification.

Additional aspects will be set forth in part in the description which follows and, in part, will be apparent from the description, or may be learned by practice of the presented embodiments.

Technical Solution

According to an embodiment, an apparatus for detecting a preamble signal of a random access channel in a base station is provided. The apparatus includes a preamble symbol unit data generator for receiving preamble symbols for a third time interval via the random access channel for each antenna to convert the same into a preamble symbol unit, wherein the third time interval is a sum of a first time interval required for transmission of the preamble symbols forming a preamble body and a second time interval two or more preamble symbols are transmitted. The apparatus includes a first fast Fourier transformer for fast Fourier transforming each output of the preamble symbol unit data generator. The apparatus includes a first sequence generator for generating the same preamble sequence as a preamble sequence used in the preamble body. The apparatus includes a coverage extension detector configured to calculate symbol power of each of the preamble symbols using the preamble sequence with respect to the first fast Fourier-transformed symbols for each antenna, calculate a non-coherent sum for each consecutive preamble symbol corresponding to the first time interval within the power calculated preamble symbols for each antenna, combine the non-coherent sums calculated for the preamble symbols at the same position for each antenna, and detect a maximum energy value among the combined non-coherent sums and a first delay value (DF) of the preamble symbols having the maximum energy value.

The apparatus includes a delay ambiguity detector configured to calculate power using the preamble sequence for two consecutive preamble symbols in the preamble symbols received for the third time interval, and estimate a second delay value (DT) of the preamble symbols using power of the two consecutive preamble symbols. The apparatus includes a preamble determiner for determining whether a preamble is received using the second delay value and the maximum energy value.

According to an embodiment, a method for detecting a preamble signal of a random access channel in a base station is provided. The method comprises receiving preamble symbols for a third time interval via the random access channel for each antenna. The third time interval is a sum of a first time interval required for transmission of the preamble symbols forming a preamble body and a second time interval two or more preamble symbols are transmitted. The method includes dividing the preamble symbols received for the third time into one preamble symbol unit. The method includes first fast Fourier transforming for fast Fourier transforming each of the divided preamble symbols respectively. The method includes generating a first preamble sequence that is the same as a preamble sequence used in the preamble body. The method includes calculating symbol power of each of the preamble symbols using the preamble sequence with respect to the first fast Fourier-transformed symbols for each antenna. The method includes calculating a non-coherent sum for consecutive preamble symbols corresponding to the first time interval within the power-calculated preamble symbols for each antenna. The method includes combining the non-coherent sums calculated for the preamble symbols at the same position for each antenna. The method includes detecting a maximum energy value amongst the non-coherent sums. The method includes generating a first delay value (DF) for the consecutive preamble symbols having the maximum energy value. The method includes calculating power using the preamble sequence for two consecutive preamble symbols in the preamble symbols received for the third time interval. The method includes estimating a second delay value (DT) of the preamble symbols using power of the two consecutive preamble symbols. The method includes determining whether a preamble is received using the second delay value and the maximum energy value.

Advantageous Effects

According to the disclosure, it is possible to provide a method and an apparatus for receiving a physical random access channel (PRACH) in a base station of a mobile communication system, and further, to provide a method and an apparatus for extending coverage of the base station.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
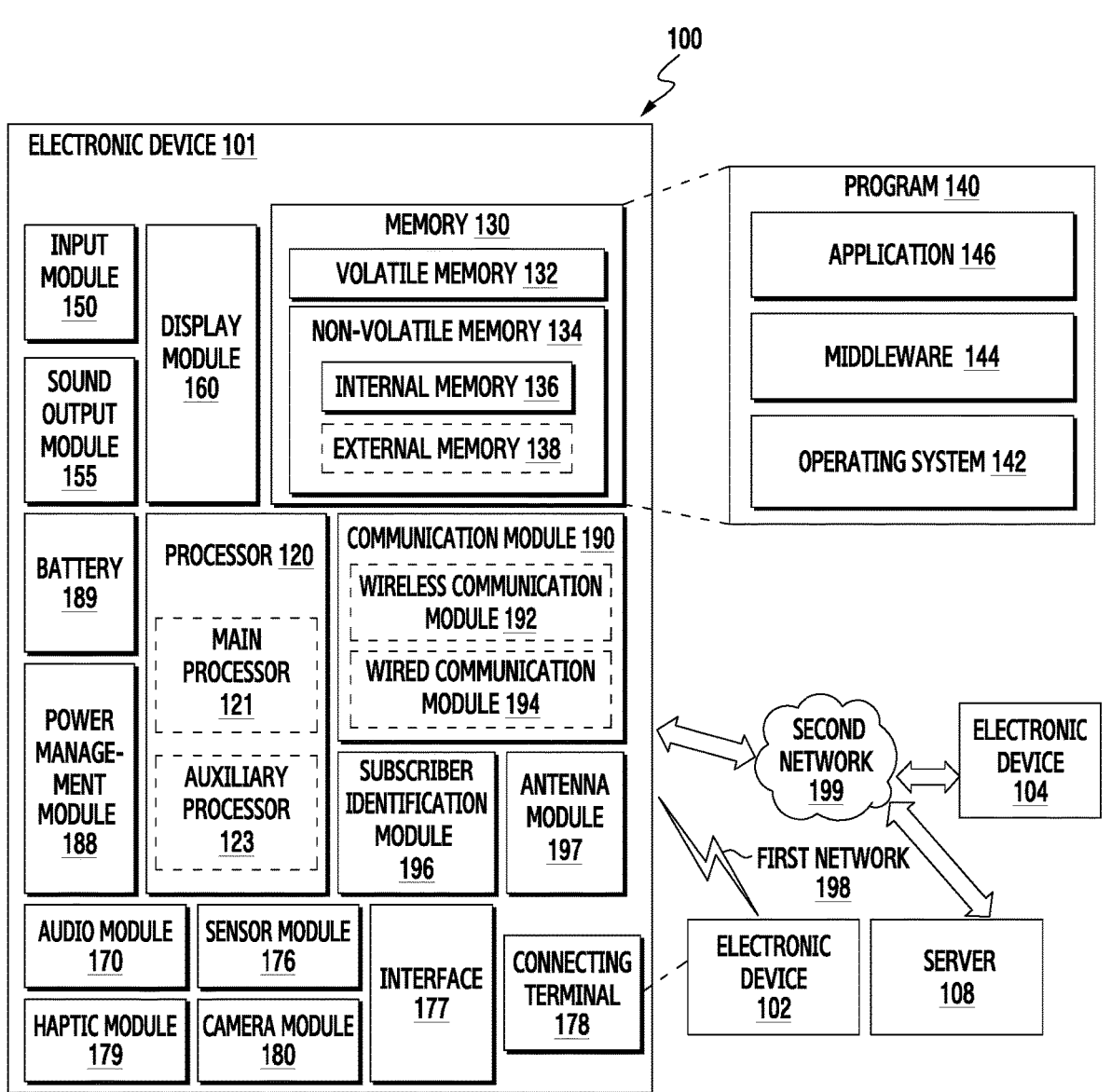
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module

192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device

101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, an example configuration of a physical random access channel (PRACH) configuration according to the disclosure is then described. Further, the electronic device described above may be used in combination with a mobile communication terminal or a terminal throughout the following description, and it may include the structure described in FIG. 1 and/or at least a portion of the structure described in FIG. 1.

Figure 2:
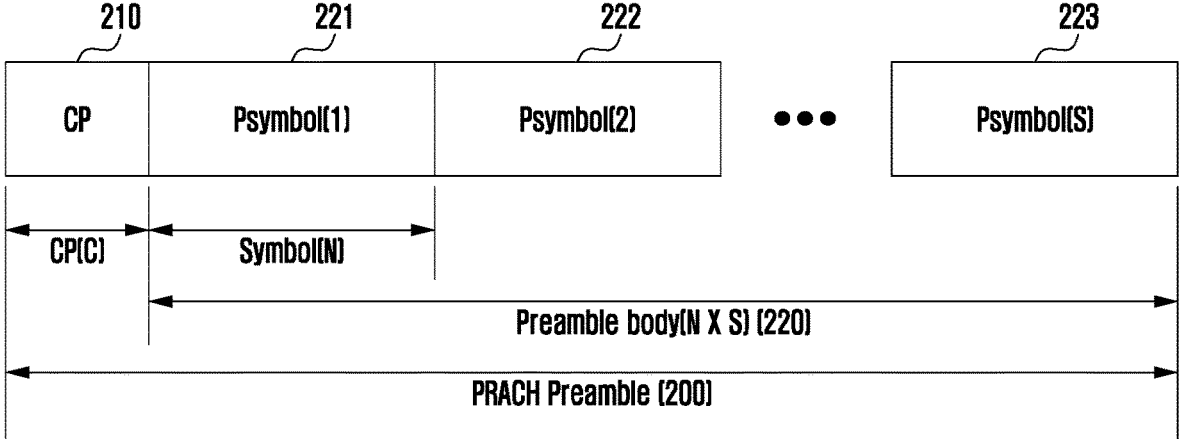
FIG. 2 is a configuration diagram illustrating a physical random access channel (PRACH) used in a mobile communication system according to an embodiment of the disclosure.

FIG. 2 is a configuration diagram illustrating a configuration of an example physical random access channel (PRACH) used in a mobile communication system according to an embodiment of the disclosure.

Referring to FIG. 2, a PRACH preamble 200 may be a signal transmitted from a terminal (e.g., the electronic device 101 of FIG. 1) to access a base station.

The PRACH preamble 200 may include a cyclic prefix (CP) 210 and a preamble body 220.

The length of the CP 210 part may be defined in various lengths according to the format of the PRACH preamble 200, and the maximum length of the CP 210 may be set equal to the length of one symbol 221, 222 or 223 forming the preamble body 220. For example, in an NR system, a length of the CP 210 of C2 format with L=139 is $2048Ts2^{-u}$, and has the same length as the length of each symbol 221, 222 or 223 forming the preamble body 220. Here, Ts is 1/30.72[us], and u is a random access subcarrier spacing (RASCS) index, with RASCS being $15\times2^{u}$ kilohertz (kHz). As a result, the length of the CP 210 has a length of one preamble symbol in the maximum or a length shorter than one preamble symbol length.

The preamble body 220 of the PRACH preamble 200 may include a plurality of symbols 221, 222, and 223. In the example of FIG. 2, S symbols (preamble symbols) 220 are exemplified. The number of preamble symbols forming the preamble body 220 may have various values according to the preamble format specified in each system standard.

On the other hand, the PRACH preamble 200 as shown in FIG. 2 uses the same shape in the NR (New Radio) system, which is a 5G system, as well as the LTE (Long Term Evolution) system amongst various standards of the mobile communication system. Further, New Radio Unlicensed (NR-U) introduced in the 3rd Generation Partnership Project (3GPP) Standard Release 16 also uses the PRACH preamble 200 with the same structure as shown in FIG. 2 for random access.

With the above structure, when the auxiliary processor 123 of the electronic device 101 illustrated in FIG. 1 includes a communication processor, the communication processor may control to generate the PRACH preamble 200, and the generated signal may be transmitted to the base station of the first network 198 and/or the second network 199 via the communication module 190. For example, the electronic device 101 may first obtain a synchronization signal transmitted by the base station, and perform synchronization with the base station based on the synchronization signal. Thereafter, when the electronic device 101 initially accesses the base station, the electronic device 101 may generate the PRACH preamble 200 and transmit the generated PRACH preamble 200 to the base station. By receiving the PRACH preamble 200, the base station may recognize (or identify) the existence (or request for communication) of the electronic device 101 located in the base station. Since the subsequent procedures are generally described in the standard specifications of each system, an additional description thereof will be omitted in this disclosure.

Further, the base station may receive and process the PRACH preamble 200 according to the number of base station antennas. For example, when the base station has two antennas, the base station may obtain a signal by combining the PRACH preambles 200 received from each of the two antennas, and when the base station has four antennas, the base station may obtain a signal by combining the PRACH preambles 200 received from each of the four antennas. A detailed procedure of obtaining the PRACH preamble 200 will be described with reference to FIGS. 3A and 3B as follows.

Figure 3A:
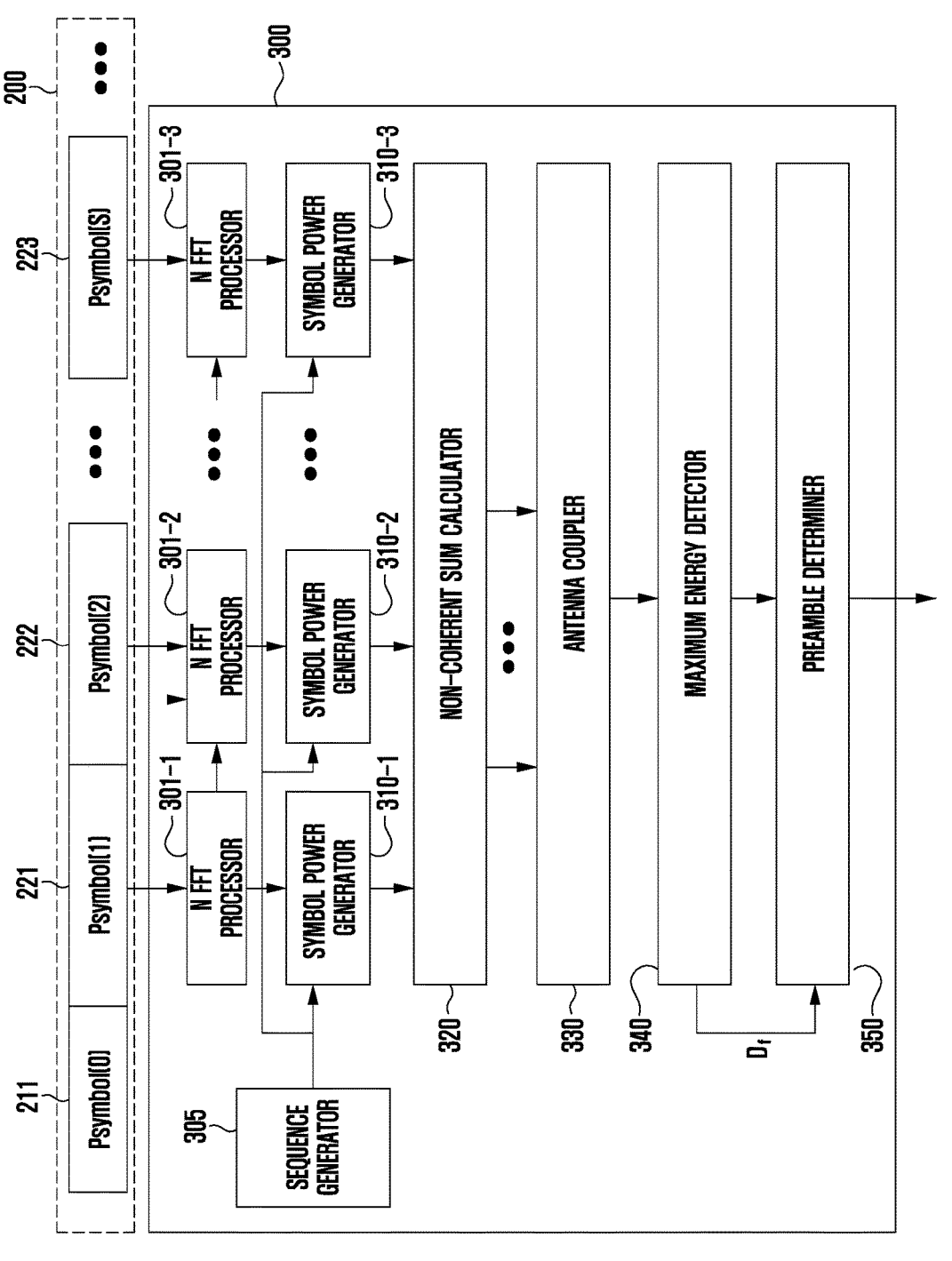
FIG. 3A is a diagram illustrating a configuration and operation of a PRACH detector in a base station of a mobile communication system according to an embodiment of the disclosure.

FIG. 3A is a diagram illustrating a configuration and operation of a PRACH detector in a base station of a mobile communication system according to an embodiment of the disclosure.

Referring to FIG. 3A, the PRACH detector of the base station exemplifies a form in which the PRACH symbols described with reference to FIG. 2 as above are received. However, the difference from FIG. 2 is to exemplify the CP 210 as a form recognized as one preamble symbol (Psymbol (0)). Thereafter, the preamble symbols 221, 222 and 223 corresponding to the preamble body 220 have the same form as in FIG. 2.

The preamble symbols 211, 221, 222 and 223 are based on the form of receiving the PRACH preamble 200 from the PRACH detector 300 of the base station. Further, for detection in the preamble symbol unit, a preamble symbol unit data generator may be separately provided to configure the preamble symbol unit data. In other words, the received preamble signal may be generated in unit of preamble symbols. For example, the CP 210 may be generated as 0-th symbol (Psymbol(0)), 1st preamble symbol (Psymbol(1)) 221 may be formed as a preamble symbol as it is, and the subsequent symbols may be then generated similarly in units of preamble symbols. As described above, the CP 210 may be the same as the length of one preamble symbol or shorter than the length of one preamble symbol. Therefore, when a symbol having a length shorter than the length of one preamble symbol is received, it may be configured as the 0-th symbol (Psymbol(0)) by padding '0' to have the length of one preamble symbol.

Further, the CP 210 may be configured not to be processed by symbol power calculators because it is not one normal preamble symbol. Referring to FIG. 3A, it is assumed that the CP 210 is not one normal preamble symbol, illustrating the form of being not input to N-size Fast Fourier Transform (FFT) processors 301-1, 301-2 and 301-3.

The PRACH detector 300 according to FIG. 3A may receive the PRACH preamble 200, which may be respectively input to N-size Fast Fourier Transform (FFT) processors 301-1, 301-2 and 301-3 for the preamble symbols except for the symbols of the CP.

Since all of N-size FFT processors (301-1, 301-2, and 301-3) (herein after N FFT processors), perform the same operation, description will be made of an operation in which one preamble symbol is input and processed. When one preamble symbol is input, the N FFT processor (301-1, 301-2, and 301-3) may convert the received time-domain signal into a frequency-domain signal. Here, N may mean that N samples are processed because one preamble symbol consists of N samples. As such, each of the N FFT processors 301-1, 301-2 and 301-3 may convert a signal in time-domain into a signal in frequency-domain, and then, output the same to corresponding symbol power calculators 310-1, 310-2 and 310-3, respectively. Further, the operation of the N-size FFT processor 311 may be defined as in Equation 1 below.

$$y[k] = FFT_N[x[n]] = \frac{1}{\sqrt{N}} \sum_{n=0}^{N-1} x[n] \exp\left(\frac{-j2\pi kn}{N}\right),$$ [Equation 1]

$$k = 0 \sim N - 1$$

Then, the symbol power calculators 310-1, 310-2 and 310-3 may calculate symbol power for each of the preamble symbols 221, 222 and 223. The symbol power calculators 310-1, 310-2 and 310-3, may receive the preamble symbols converted into a frequency-domain signal as each input in the N FFT processors 301-1, 301-2 and 301-3, and calculate power corresponding to each of the preamble symbols 221, 222 and 223 based on the sequence received from the sequence generator 305. Each of the preamble symbols 221, 222 and 223 may all have the same symbols, and may include N samples in one symbol. The symbol power calculators 310-1, 310-2 and 310-3 may all have the same configuration, which will be described with reference to FIG. 3B as below.

Figure 3B:
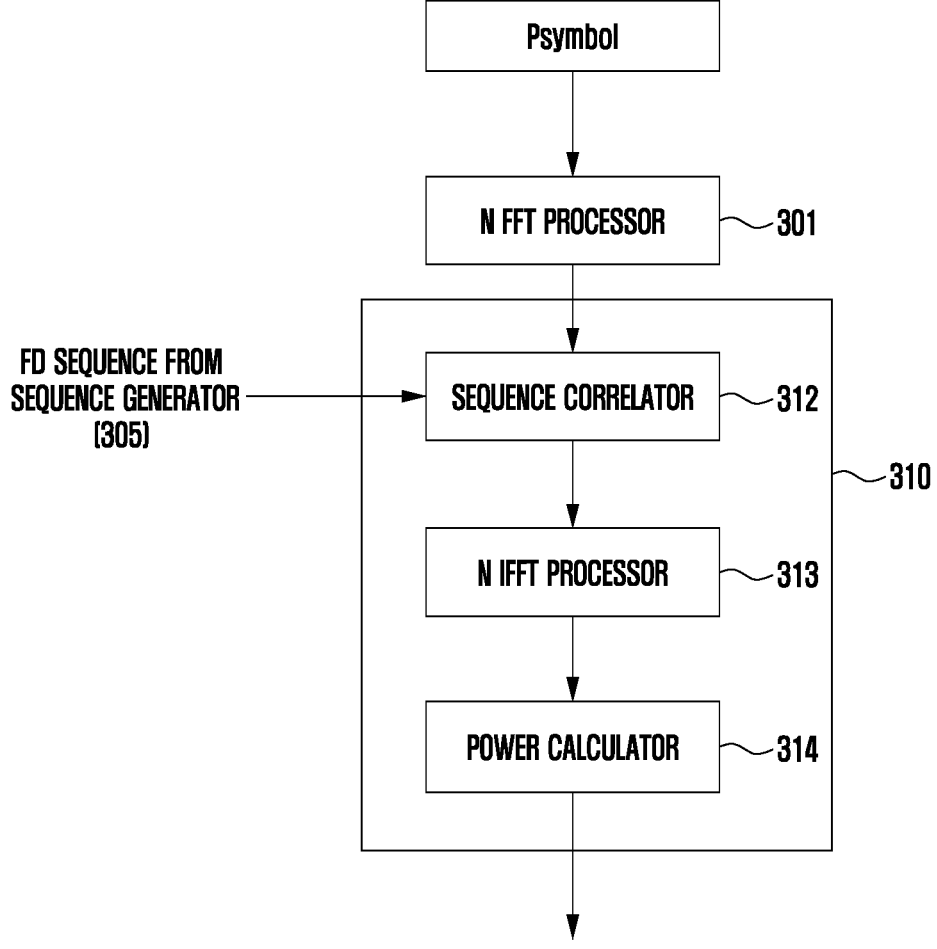
FIG. 3B is a diagram illustrating an internal block configuration of a symbol power calculator according to an embodiment of the disclosure.

FIG. 3B is a block diagram illustrating an internal block configuration of a symbol power calculator according to an embodiment of the disclosure.

Referring to FIG. 3B, the symbol power calculator 310 illustrates the configuration in which data of one preamble symbol unit is processed. Accordingly, it may include a sequence correlator 312 for processing the input from one N Fast Fourier transform (FFT) processor 301, an Inverse Fast Fourier transform (IFFT) processor 313 and a power calculator 314. A procedure of processing one preamble symbol will be described with reference to FIG. 3B as below.

Since each of the symbol power calculators 310-1, 310-2 and 310-3 all have the same structure, description will be first made of the configuration and operation of one symbol power calculator 310 with reference to FIG. 3B. FIG. 3B may illustrate the configuration of one specific symbol power calculator 310. Here, the number of components of the symbol power calculator 310 may be provided as many as the number of preamble symbols. If it is implemented with a single integrated circuit, the symbol power calculator 310 may perform parallel processing as many as the number of preamble symbols. Further, it is assumed that Psymbol (0) configured of the CP 210 is not processed as described in FIG. 3A. However, it is to be noted that the disclosure does not exclude the case that the CP 210 is also processed in one symbol power calculator 310. Therefore, when it is configured to process Psymbol(0), the number of the symbol power calculators 310 may be configured to be one more than the number of the preamble symbols, or implemented to be processed in parallel by one more than the number of the preamble symbols.

The sequence correlator 312 uses the input of the FFT processor 301 and the used frequency-domain (FD) sequence generated by the sequence generator 305 of FIG. 3A to process the correlation between the two signals and output the same.

Then, description is made of the sequence generator 305. A sequence generator 305 may generate a sequence of FD used by the electronic device 101 to transmit the PRACH preamble. As illustrated in FIG. 3A, the sequence generated by the sequence generator 305 may be input to the respective symbol power calculators 310-1, 310-2 and 310-3. More specifically, the sequence generator 305 may generate a sequence identical to a sequence for PRACH preamble used by the electronic device 101. The sequence generator 305 may input the generated sequence to the sequence correlator 312. The electronic device 101 may transmit the PRACH preamble by using only L subcarriers smaller than N in a subcarrier band having N subcarriers for PRACH transmission. Accordingly, when the electronic device 101 uses only L subcarriers for transmission of the preamble symbol, the sequence generator 305 may process as '0' for the remaining subcarriers and generate a frequency-domain (FD) sequence only for L subcarriers the actual PRACH preamble has been transmitted.

The sequence correlator 312 may correlate the FD sequence output from the sequence generator 305 and the input of the FFT processor 301 and output a result of the correlation. Correlation processing may refer to having the higher power as the correlation between the signal output from the sequence generator 305 and the signal output from the N FFT processor 301 increases. As an example of such a correlation processing scheme of the sequence correlator 312, it may be possible to multiply the FFT-transformed signal by the conjugate value of the sequence generator 305. The output correlated from the sequence correlator 312 may be input to the IFFT processor 313.

The first letter N before the IFFT processor 313 is used to indicate N subcarriers converted to the frequency-domain as described above. Therefore, the IFFT processor 313 may perform an inverse Fast Fourier transform on the frequency-domain-transformed and correlation-processed signal to output the signal in the time-domain again. As such, the IFFT processor 313 may output correlated N samples, which output of the IFFT processor 313 may be input to the power calculator 314.

The operation of the N-size IFFT processor 313 may be defined as in Equation 2 below.

$$x[n] = IFFT_N[y[k]] = \frac{1}{\sqrt{N}} \sum_{k=0}^{N-1} y[k] \exp\left(\frac{j2\pi kn}{N}\right), \quad \text{[Equation 2]}$$

$$n = 0 \sim N - 1$$

The power calculator 314 may calculate and output the power of the signal output from the IFFT processor 313. Such a power calculation of the power calculator 314 may be carried out by calculating the power of each sample with squaring an absolute value of its complex number. Each output of the symbol power calculators 310-1, 310-2 and 310-3 of FIG. 3B as described above may be the power of one preamble symbol, respectively.

Then, further description is made again with reference to FIG. 3A.

For the output of each of the symbol power calculators 310-1, 310-2 and 310-3, a power sum of all symbols may be calculated and output in a non-coherent sum calculator 320. Specifically, the sample power calculated for each preamble symbol may be output adding by the number of preambles for each sample, that is, S in the non-coherent sum calculator 320.

The configurations beyond the non-coherent sum calculator 320 may be implemented for each antenna. More specifically, the symbol power calculators 310-1, 310-2 and 310-3 and the non-coherent sum calculator 320 may be provided for each antenna. For example, when the base station has only one antenna, it may include only one non-coherent sum calculator 320, and may be implemented only with the symbol power calculators 310-1, 310-2 and 310-3 corresponding to one non-coherent sum calculator 320. On the other hand, when the base station has two or more antennas, it may include the above-described components for each antenna.

The antenna coupler 330 may not be included in the case of a base station having only one antenna. However, since a plurality of antennas are generally used in the state-of-the-art mobile communication system, it may include the antenna coupler 330. The antenna coupler 330 may combine the outputs of the non-coherent sum calculator 320 for each antenna, corresponding to each symbol power calculator. The combined signal may be output to a maximum energy detector 340.

The maximum energy detector 340 may calculate the maximum power and the delay, using N power values from the antenna coupler 330. Here, the delay may be of a sample index having the maximum power. In FIG. 3A, the delay is denoted by $D_f$.

The preamble determiner 350 may receive the maximum power and the delay and determine whether the preamble is detected by comparing the same with a preset threshold. For example, when the maximum energy is greater than the preset threshold, the preamble determiner 350 may determine that the preamble has been received, and when the maximum energy is less than the preset threshold, the preamble determiner 350 may determine that the preamble has not been received.

Referring to FIGS. 3A and 3B, it is illustrated the configuration in which no coherent sum is considered. If the implementation of the PRACH detector may be configured to calculate the coherent sum prior to the power calculation, it is to be noted that it is not included in the disclosure for the sake of simplicity of description. Therefore, the disclosure may be also applied to even the case where the coherent sum is included.

The coverage of the base station receiving the PRACH preamble described above may have various forms according to the format of the PRACH preamble. The change in the base station coverage according to RASCS in C2 format of NR, which is one of the current 3GPP standards, may be illustrated as seen in Table 1 below.

TABLE 1

|  | RASCS[Hz] | CP length[Sec] | Coverage |
|---|---|---|---|
| NR C2 format | 15 k | $2048T_s\,2^{-0}$ | 10 km |
| (Release 15) | 30 k | $2048T_s\,2^{-1}$ | 5 km |
|  | 60 k | $2048T_s\,2^{-2}$ | 2.5 km |
|  | 120 k | $2048T_s\,2^{-3}$ | 1.25 km |
| NR C2 format for | 240 k | $2048T_s\,2^{-4}$ | 625 m |
| 52.6 GHz to 72 GHz | 480 k | $2048T_s\,2^{-5}$ | 312.5 m |
| (Release 17) | 960 k | $2048T_s\,2^{-6}$ | 156.25 m |

According to the Table 1 as illustrated above, it can be seen that as the RASCS increases from 15 k to 120 k in Release 15 NR C2, the coverage by the standard CP length is reduced from 10 km up to 1.25 km. Further, in Release 17, the C2 coverage may be reduced to 0.625 km, 0.312 km, and 0.15625 km as it is being considered to extend up to 240 k, 480 k, and 960 k as a candidate RASCS for the 52.6 gigahertz (GHz) to 72 GHz band.

In order to prevent occurrence of such a phenomenon, it may be considered a scheme to allow the delay longer than the length of the preamble symbol. However, it may be not easy because the standard specification will require modification. Accordingly, even if the preamble symbol is further delayed in the PRACH detector 300 of the base station, a solution for detecting it may be sought.

Figure 4:
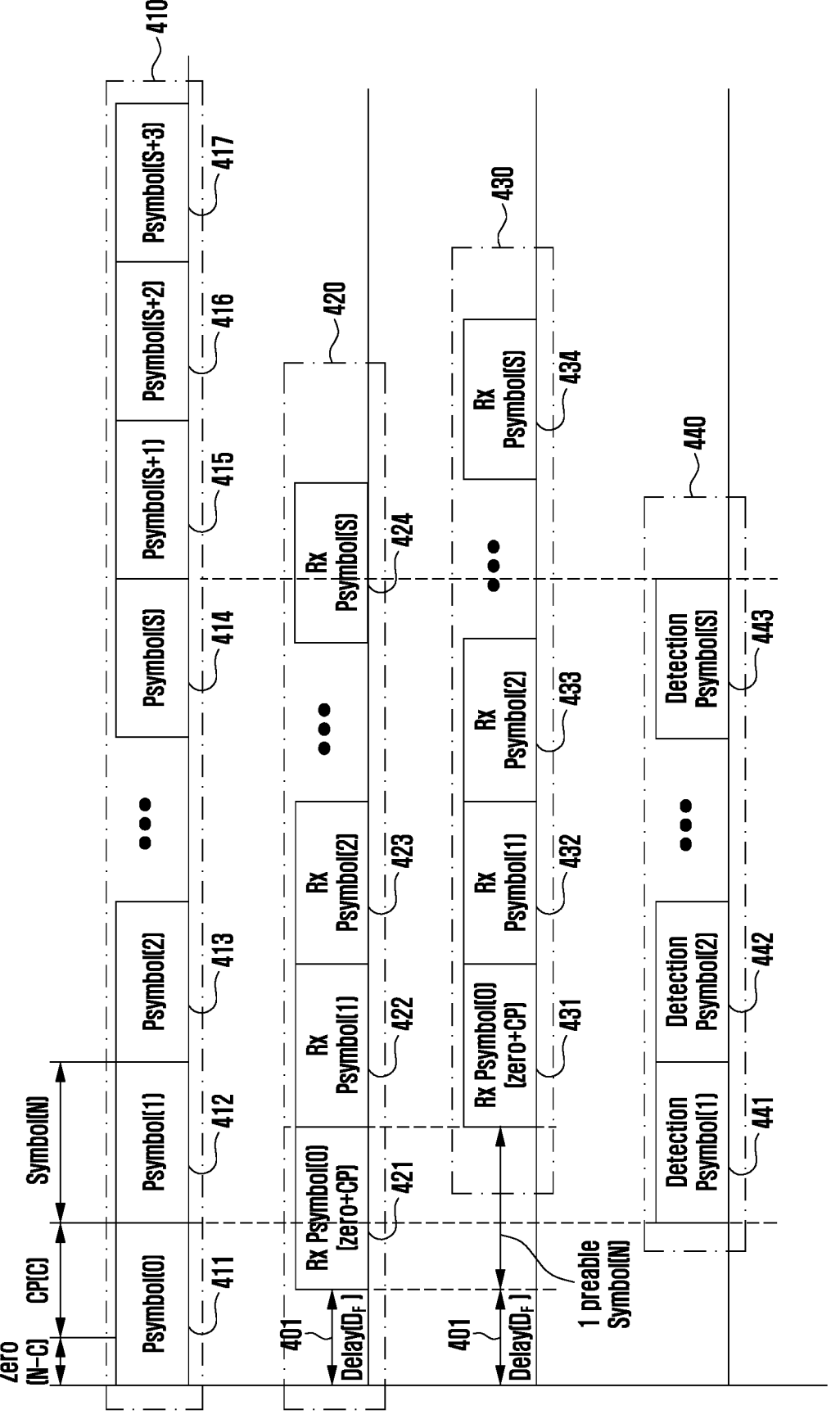
FIG. 4 is a view illustrating an operation in which preamble detection is performed by receiving a preamble symbol from a PRACH detector according to an embodiment of the disclosure.

FIG. 4 is a diagram illustrating an operation in which a preamble detection is performed by receiving a preamble symbol from a PRACH detector according to an embodiment of the disclosure.

First, an operation of receiving a preamble symbol in the PRACH detector based on FIGS. 3A and 3B will be described with reference to FIG. 4.

Referring to FIG. 4, a reference numeral 410 may refer to a case in which the PRACH preamble transmitted by the UE is detected by the PRACH detector 300 described with reference to FIGS. 3A and 3B, which may be understood in the same manner as the PRACH preamble as illustrated in FIGS. 2 and 3A. However, it is to be noted that in FIG. 4, description is made using different reference numerals. For example, the PRACH detector 300 may be of a form in which the CP 210 illustrated in FIG. 2 for the PRACH preamble 410 is recognized as one preamble symbol (Psymbol(0)) as described in FIG. 3A, and then, the actual preamble symbols 412, 413 and 414 may be continuously transmitted by the number of times as many as S.

A preamble symbol configurator (not shown in FIGS. 3A and 3B), being configured to have the length of one preamble symbol even for this section of CP from the received signal, and configured to have as much as one preamble symbol length for each of the actual one preamble symbol may be further included in the apparatus according to the embodiments of the disclosure. It depends on a preferred scheme of implementation, so the disclosure does not place particular restrictions on the form of implementation of such an apparatus.

FIG. 4 illustrates a form in which other preamble symbols are received after S+1 consecutive preamble symbols including the CP. These preambles may actually be received with delayed preamble symbols 415, 416 and 417 transmitted from one specific terminal. As another example, they may be the preamble symbols received from a terminal other than the terminal that previously transmitted the preamble symbols.

A reference numeral 420 may refer to a case in which the preamble symbols are received within a delayed range commonly required according to the standard specification of a mobile communication system. Therefore, the preamble signals may be received in the order of a 0-th preamble symbol 421 corresponding to the CP 210 in the PRACH detector, a first preamble symbol 422, a second preamble symbol 423, and then, the last and S-$^{th}$ preamble symbol 424, after it is delayed by D$_F$ (Fractional Delay) 401, which is a delay (including propagation delay and multipath delay) as much as the time allowed in the standard protocol through a radio channel. Accordingly, the PRACH detector 300 may detect the preamble symbols 441, 442 and 443 as indicated by reference numeral 440.

Meanwhile, a reference numeral 430 illustrates the case in which the PRACH preamble has a delay longer than one preamble symbol length. For example, the PRACH detector 300 may receive the preamble symbols even when it is more delayed by one preamble symbol length adding to the DF 401, which is a common transmission delay interval.

When there is an additional delay as much as the length of one preamble symbol as shown in the reference numeral 430, even if it is generated the delay as much as the preamble symbol length or M times of the preamble symbol length N, the preamble determiner 350 of the preamble detector cannot recognize it accurately. In other words, in the case where the delay is made by the preamble symbol length N adding to the DF 401, the actual delay becomes DF+N. Here, N indicate the preamble symbol length.

At this time, the preamble determiner 350 of the PRACH detector 300 performs a modular operation to calculate the delay. Such a modular operation may be calculated by Equation 3 below.

$$D_F = \text{mod}(D_F + N, N) \qquad \text{[Equation 3]}$$

Based on the calculation of Equation 3 as above, the DF 401 may have a value from 0 to "N−1". As a result, as the above operation is carried out, the PRACH detector 300 would be unable to distinguish between a case with the delay D$_F$ 401 only and another case with D$_F$+N.

Hereinafter, detailed description will be made of the case in which the PRACH detector 300 has a delay of D$_F$+N, with reference to FIG. 4, when such a delay exceeds N. Further, although the delay, such as e.g., N, 2N, 3N or the line may actually occur, it is assumed that in relation to the reference numeral 430 of FIG. 4, the delay is N for convenience of description. Therefore, description will be made of both the case with a delay of DF+N as in the reference numeral 430 and the case of a delay of D$_F$ 401, which is a normal range of delay allowed in the standard specification of the related art.

The PRACH detector 300 may receive Psymbol(0), such as a reference numeral 431 actually, at the position of Psymbol (1) 432 where the first preamble symbol is expected to be received, that is, at the position where the normal first preamble symbol 422 is expected to be received. Since Psymbol(0) is configured of zero and CP as illustrated by the reference numeral 421, it may be of a state in which there are no symbols (zero padding). Accordingly, the PRACH detector 300 anticipates Psymbol(1) to perform processing of the preamble symbol, but degraded performance of the PRACH detector 300 may occur, as Psymbol (0) is actually received.

Since the PRACH detector 300 is driven in the above-described manner, when N is 2, that is, when it is delayed by the length of two preamble symbols, the degradation in performance of the PRACH detector 300 may be further aggravated.

Furthermore, in case where the standard is applied as it is as described above, if the coverage of the base station is seriously reduced, then the service provider may become impossible to install and operate such a base station. In addition, in case where the existing PRACH detector 300 is used as it is, if it is received a preamble symbol with a delay longer than the preamble symbol length, then a problem may occur in that it is difficult to detect the preamble symbol accurately due to degraded performance.

Accordingly, the disclosure provides a method capable of extending the coverage of a base station without changing the configuration of a standard PRACH preamble, and a detection apparatus according thereto.

Figure 5:
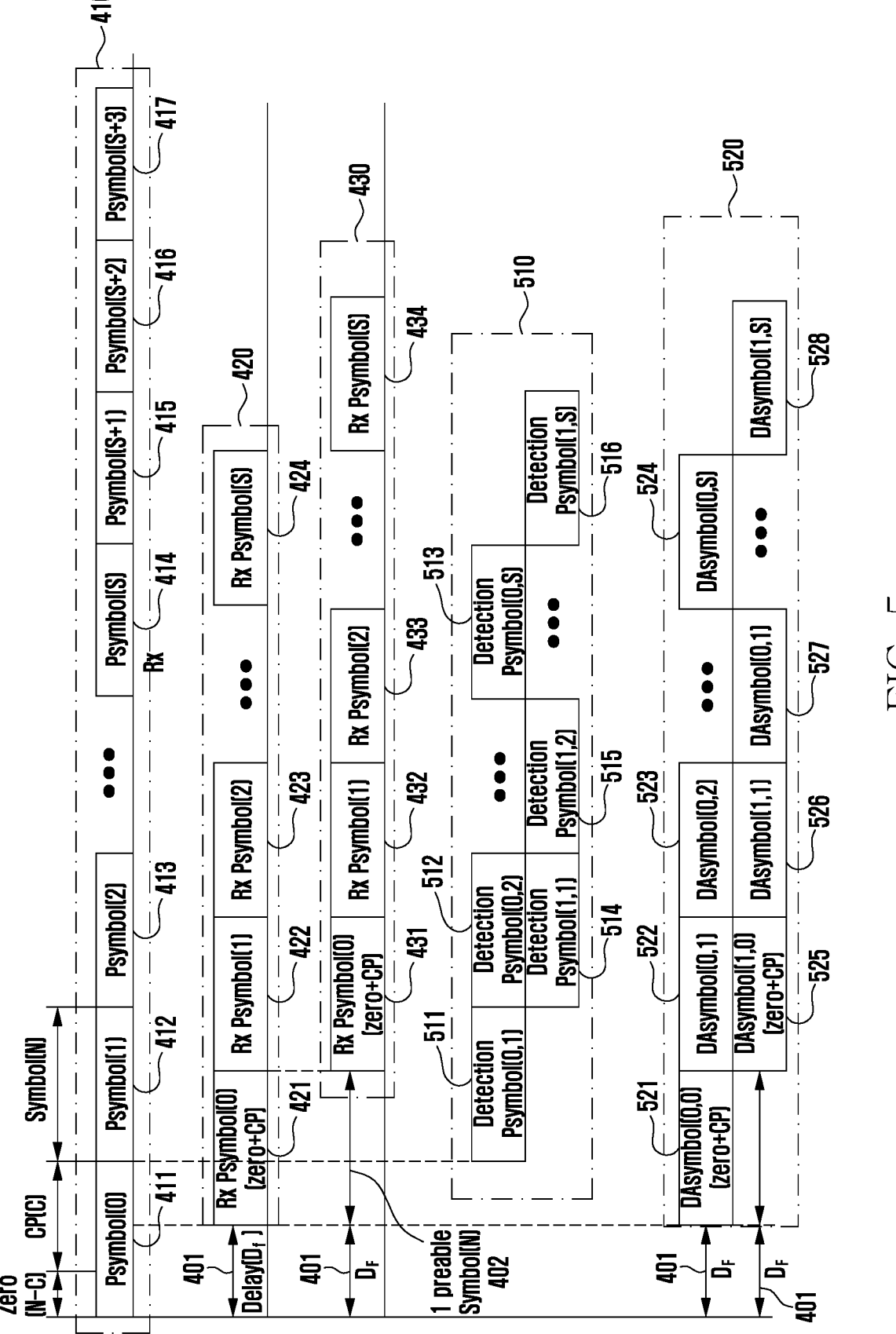
FIG. 5 is a diagram illustrating preamble symbol detection in a PRACH detector according to an embodiment of the disclosure.

FIG. 5 is a diagram illustrating preamble symbol detection in a PRACH detector according to an embodiment of the disclosure.

Referring to FIG. 5, the same reference numerals are used for the same parts compared to those of FIG. 4 described above. For example, the reference numeral 410 illustrate a unit that the PRACH detector recognizes as a symbol in order to detect from the PRACH detector the PRACH preamble transmitted by the UE.

The reference numeral 420 illustrates a case in which PRACH preamble symbols are received within a certain delay range generally required by the standard specification of a mobile communication system. Therefore, the reference numeral 420 illustrates the case that after delaying by D$_F$ 401, which is the delay (inclusive of propagation delay and delay due to multi-path) transmitted through a radio channel, the preamble symbols are received in the order of the 0-th preamble symbol 421 corresponding to the CP 210 in the PRACH detector, the first preamble symbol 422, the second preamble symbol 423, and then finally, the last S-th preamble symbol 424.

The reference numeral 430 illustrates a case in which the RRACH preamble has a delay of one preamble symbol length 402 adding to the $D_F$ 401. For example, the reference numeral 430 illustrate the case having a delay of $D_F$+N.

Thereafter, according to the disclosure, description is made of a method for identifying a case in which a delay occurs by a length longer than the length of one preamble symbol and another case in which preamble symbols are received within a certain delay range required in the standard specification of the mobile communication system.

First, detection preamble symbols 511, 512 and 513 illustrated above in a reference numeral 510 may be of a case that the preamble symbols except for the CP 210 described in FIG. 2 are received within the delay range required in the standard specification of the mobile communication system. Further, the preamble symbols 514, 515 and 516 illustrated below in the reference numeral 510 may be of a case that the preamble symbols except for the CP 210 are further delayed by one preamble symbol length adding to the delay range required in the standard specification of the mobile communication system.

In the following description, for convenience of explanation, when the delay is made within the range of the CP 210, that is to say, a delay applied to the detection preamble symbols 511, 512 and 513 with only the delay of as much as $D_F$ 401 will be referred to as a "first delay". Further, when further delay is made by the length of one preamble symbol 402 within the range of the CP 210, that is to say, a delay applied to the detection preamble symbols 514, 515 and 516 with the delay of DF+N will be referred to as a "second delay".

Although FIG. 5 of the disclosure only illustrates the case of additional delay by the length of one preamble symbol due to limitations in the drawing, it may be extended to a case of delay by two preamble symbol lengths. In this case, a "third delay" may be considered. When considering the third delay, the detection position of the first preamble symbol may be the position of reference numeral 515, which may be of a case in which a total of S preamble symbols are continuously detected. Hereinafter, for convenience of explanation, description will be made only using the first delay and the second delay.

When only two delays (e.g., the first delay and the second delay) are considered, the PRACH detector may attempt to detect the preamble symbol, assuming that the preamble symbols 511, 512 and 513 are to be received in the first delay, and attempt to detect the preamble symbol, assuming that the preamble symbols 514, 515 and 516 are to be received in the second delay. In other words, the actual signal detection of the PRACH detector may be of detection from Psymbol(1) to Psymbol(S) and detection from Psymbol(2) 433 to Psymbol(S+1) 434. As such, as the PRACH detector is allowed to detect the preamble symbols, the detection using S preambles upon detecting the delayed signal can exist always. Accordingly, even when the PRACH detector has a delay longer than the length of one preamble symbol, it is possible to prevent deterioration in performance due to the detection.

However, even if the above scheme is used, the PRACH detector may still have ambiguity of delay. For example, the base station is need to identify how much the preamble symbol is delayed, for example, whether it is either delayed by $D_F$ 401 (first delay) or delayed by $D_F$+N (second delay).

In the disclosure, in order to address delay ambiguity, the 0-th preamble symbol including the CP may be additionally detected. A reference numeral 520A illustrates a preamble detection scheme for resolving delay ambiguity according to the disclosure.

The detection scheme according to the disclosure will be described as follows. The PRACH detector may receive from the 0-th preamble symbol 521 to the S-th preamble symbol 524, assuming the case of first delay considering only the delay of the $D_F$ 401. As such, it is possible to measure the power for the PRACH in the case of the first delay by calculating the accumulated power, after taking correlation with respect to the preamble symbols 521, 522, 523 and 524 received assuming the first delay.

Now, a circumstance is assumed that no interference, fading, or other influence exists, and the preamble transmitted by a terminal transmits the preamble signal at a position corresponding to the first delay. Further, it can be seen that the first delay has a relationship between the frequency and the distance as illustrated in the Table 1 above. Therefore, the case of 'first delay' may be of a case in which the terminal transmits the preamble signal to the base station at a distance having a delay within a maximum of one preamble symbol period. Further, the 'second delay' case may be of a case in which the terminal located at a farther distance by one preamble symbol length than the relationship between the frequency and the distance illustrated in Table 1 transmits the preamble signal to the base station.

In order to remove ambiguity in these two cases, the PRACH detector may compare the accumulated power of the preamble symbols assuming the first delay with the accumulated power of the preamble symbols assuming the second delay to determine whether it is either the first delay or the second delay.

This will be described by taking the reference numeral 520 illustrated in FIG. 5 as an example. The PRACH detector of the base station may receive the preamble signals from the 0-th preamble symbol 521 to the S-th preamble symbol 524, assuming the case of the delay (first delay) of the $D_F$ 401. Further, the PRACH detector of the base station may receive the preamble signals from the 0-th preamble symbol 525 to the S-th preamble symbol 528, assuming the case of the second delay, which corresponds to a delay of the $D_F$ 401 and one preamble symbol length N.

As such, it is possible to measure the accumulated power value for the first delay and the accumulated power value for the second delay, by calculating the accumulated power after taking the correlation with respect to the preamble symbols received assuming the first delay and the second delay.

If it is the case the terminal transmits the preamble signal within the first delay range, then the accumulated power value of the preamble symbol when the first delay is assumed in the PRACH detector of the base station may be greater than the accumulated power value of the preamble symbol when the second delay. In other words, the accumulated power when the first delay is assumed will have a higher accumulated power value by one preamble symbol than the accumulated power when the second delay is assumed.

On the contrary, if it is of a case the terminal transmits the preamble signal at the position of the second delay, then the accumulated power when the first delay is assumed will have a lower power value by one preamble symbol than the accumulated power when the second delay is assumed.

The PRACH detector may compare the results of the calculation of the accumulated powers as described above, and based on the compared results, determine the delay of the preamble symbol having a higher accumulated power value as the actual delay, thereby resolving the ambiguity of the delay.

Looking at this determination process using the preamble symbols of the reference numeral 520 of FIG. 5, it is assumed that there are S preamble symbols, and thus, the power of the symbols from DAsymbol(0,1), which is the first preamble symbol 522 assuming the first delay, to DAsymbol(0,S), which is the S-th preamble symbol 524, and the power of the symbols from DAsymbol(1,0), which is the 0-th symbol 525 assuming the second delay, to DAsymbol(1, S−1), which is the (S−1)-th symbol, may be received in common or similarly. Explaining this process as an example, according to the previous description, the C2 format may be of a case where there is no zero value. In the case of the C2 format as described above, the actual copied data may be used. Further, since the CP part and the zero part are included in the case of formats other than the C2 format, the power of symbols from DAsymbol(0,1) to DAsymbol (0,S) in the first delay and the power of symbols from DAsymbol(1,0) to DAsymbol(1,S−1), which is the (S−1)-th symbol, in the second delay may be similarly received. Therefore, for the power to resolve the ambiguity of the delay, it is possible to calculate the power of the first delay and the power of the second delay by calculating the correlation for DAsymbol(0,0), which is the 0-th symbol 521 in the first delay, and DAsymbol(1,S), which is the S-th symbol 528 in the second delay, respectively, and then, calculating the power of the correlated symbol.

Figure 6:
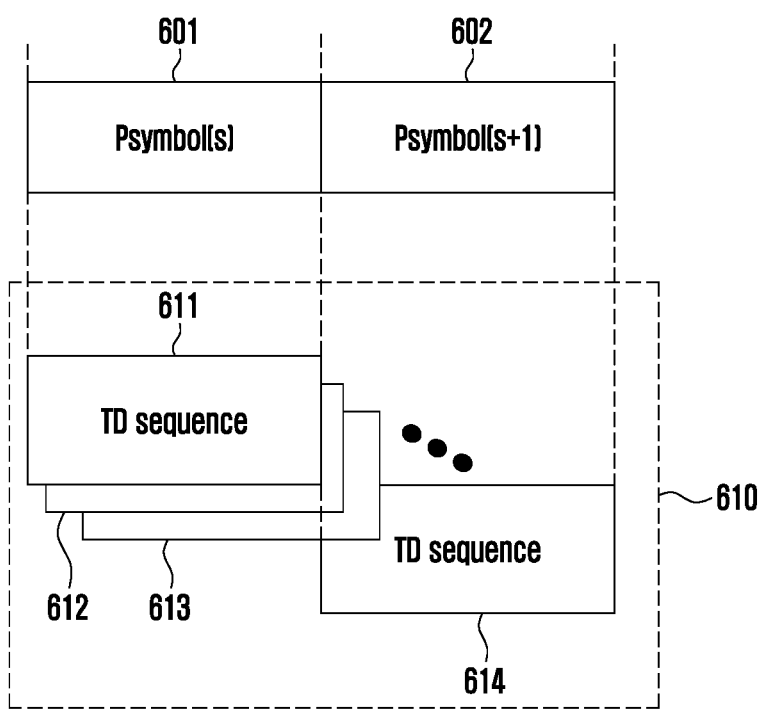
FIG. 6 is a diagram illustrating calculating a sliding window correlation according to an embodiment of the disclosure.

FIG. 6 is a diagram for illustrating calculating a sliding window correlation according to an embodiment of the disclosure.

First, the first delay described with reference to FIGS. 4 and 5, that is, the delay of $D_F$ 401 can be known after the signal is detected. Hence, the delay of $D_F$ 401 may be obtained through the selection of the power of the $D_F$ delay after calculating the delay power from 0-th preamble symbol to (N−1)-th preamble symbol through the sliding window correlation in the time-domain (TD).

Further description of the above process will be made with reference to FIG. 6.

Referring to FIG. 6, Psymbol(s) 601 and Psymbol(s+1) 602 are illustrated. Therefore, it is possible to select the delay power of the DF 401 by calculating the delayed power from 0 to N−1 through the sliding window correlation with respect to the Psymbol(s) 601. This is because the maximum delay length of the preamble symbol can be delayed up to the maximum of one preamble symbol length according to the standard protocol as described above. Therefore, the time-domain sequences 611, 612, 613 and 614 indicated within a reference numeral 610 may mean the delay from 0 to N−1.

Further, it can be seen that the sliding window correlation in the time-domain requires only N samples because it is the delay from 0 to N−1. Based on this fact, the sliding window may be implemented in the form of N circular correlations. It may be also represented as a product of an input signal and a sequence conjugate in the frequency-domain (FD). It can be implemented in practice using this technique.

Describing the sliding window correlation again with reference to FIG. 5, the sliding window correlation of DAsymbol(0,0)(521) may be calculated using Psymbol(0) (411) and Psymbol(1)(412) and the sliding window correlation of DAsymbol(1,S) may be calculated using Psymbol (S+1)415 and Psymbol(S+2)416. In this way, the power of the $D_F$ delay can be obtained through the sliding window correlation in the time-domain (TD).

Figure 7A:
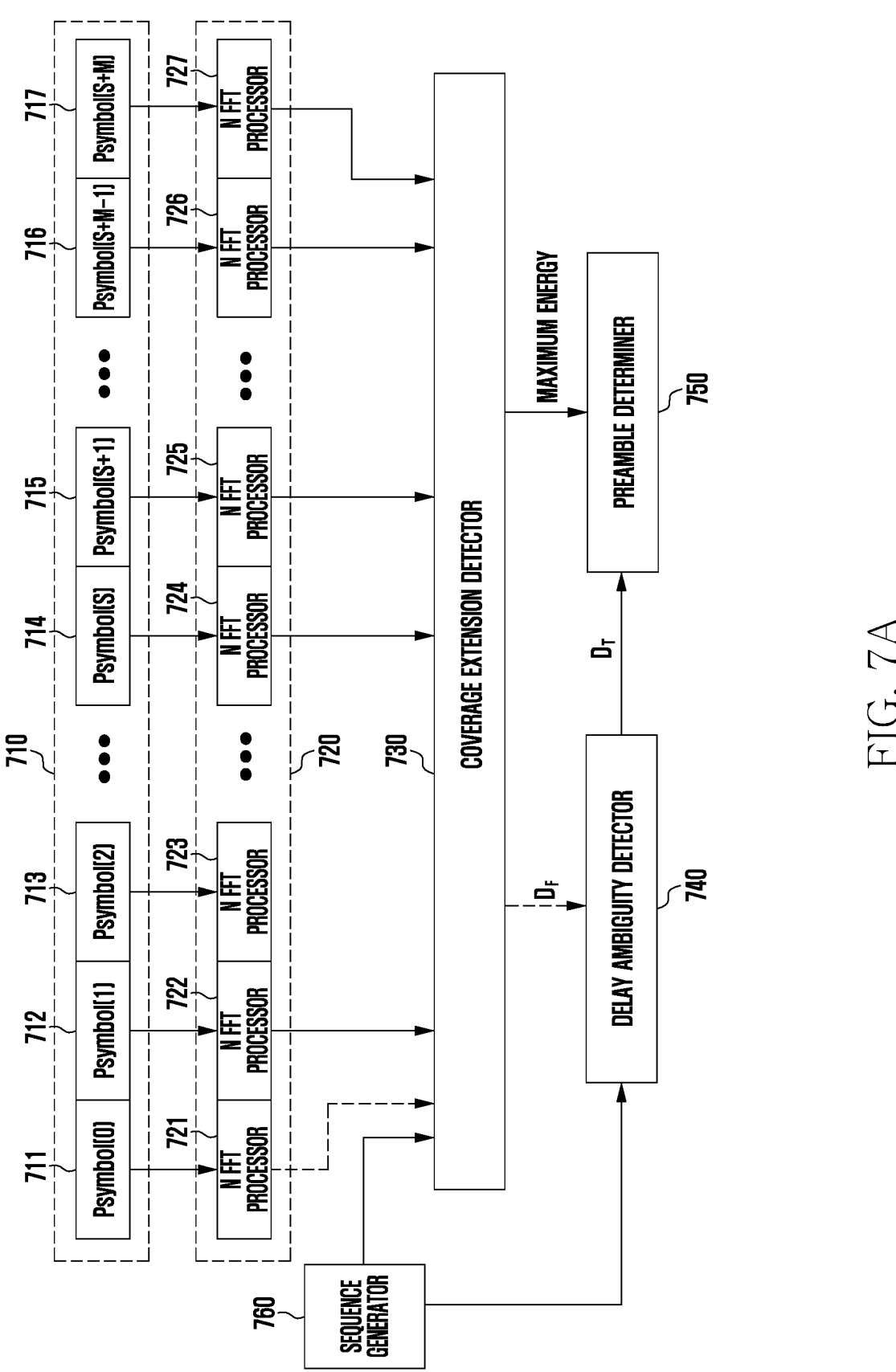
FIG. 7A is a diagram illustrating a structure of a PRACH detector when extended to M preamble symbols according to an embodiment of the disclosure.
Figure 7B:
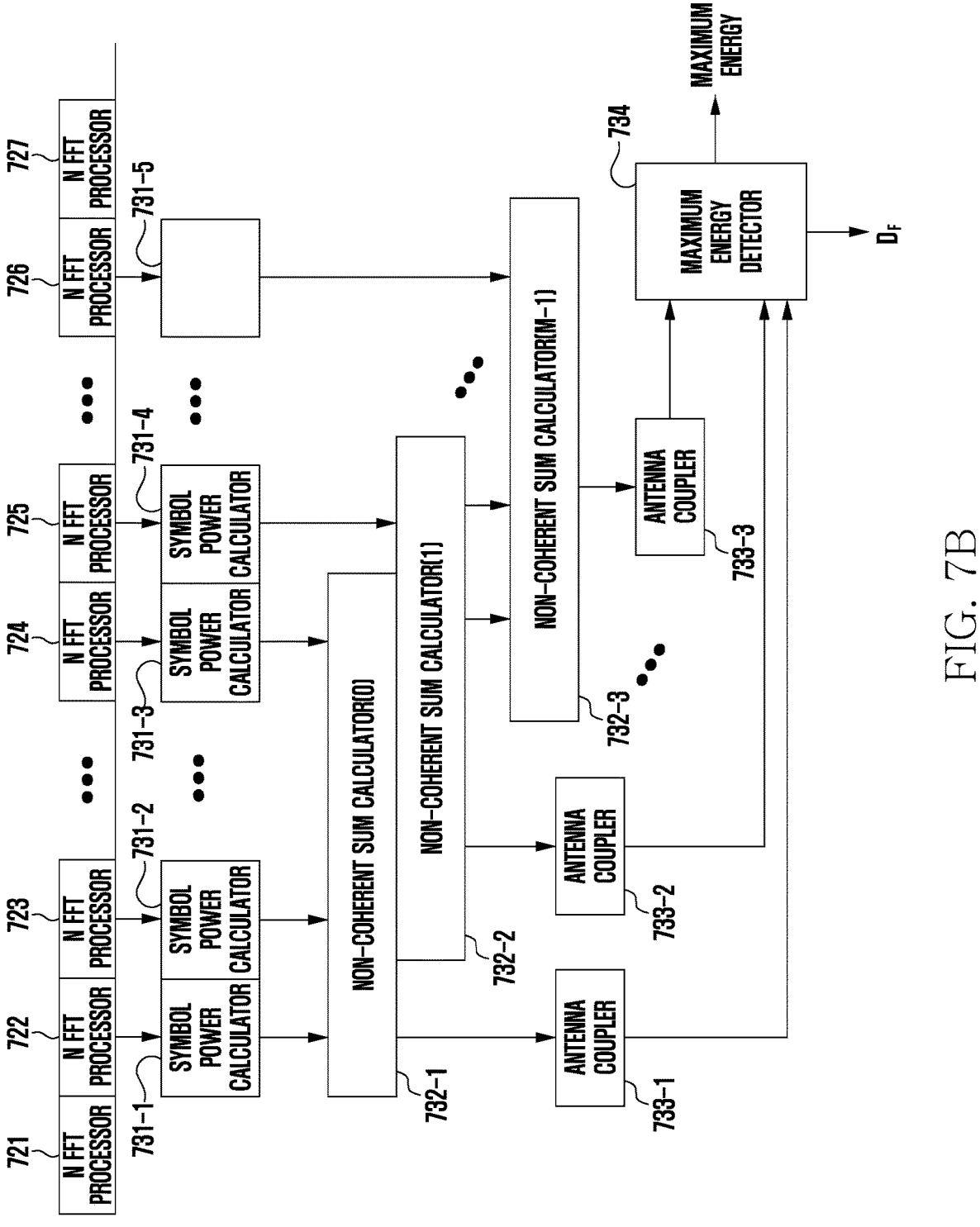
FIG. 7B is a diagram illustrating a configuration of a coverage extension detector of FIG. 7A according to an embodiment of the disclosure.
Figure 7C:
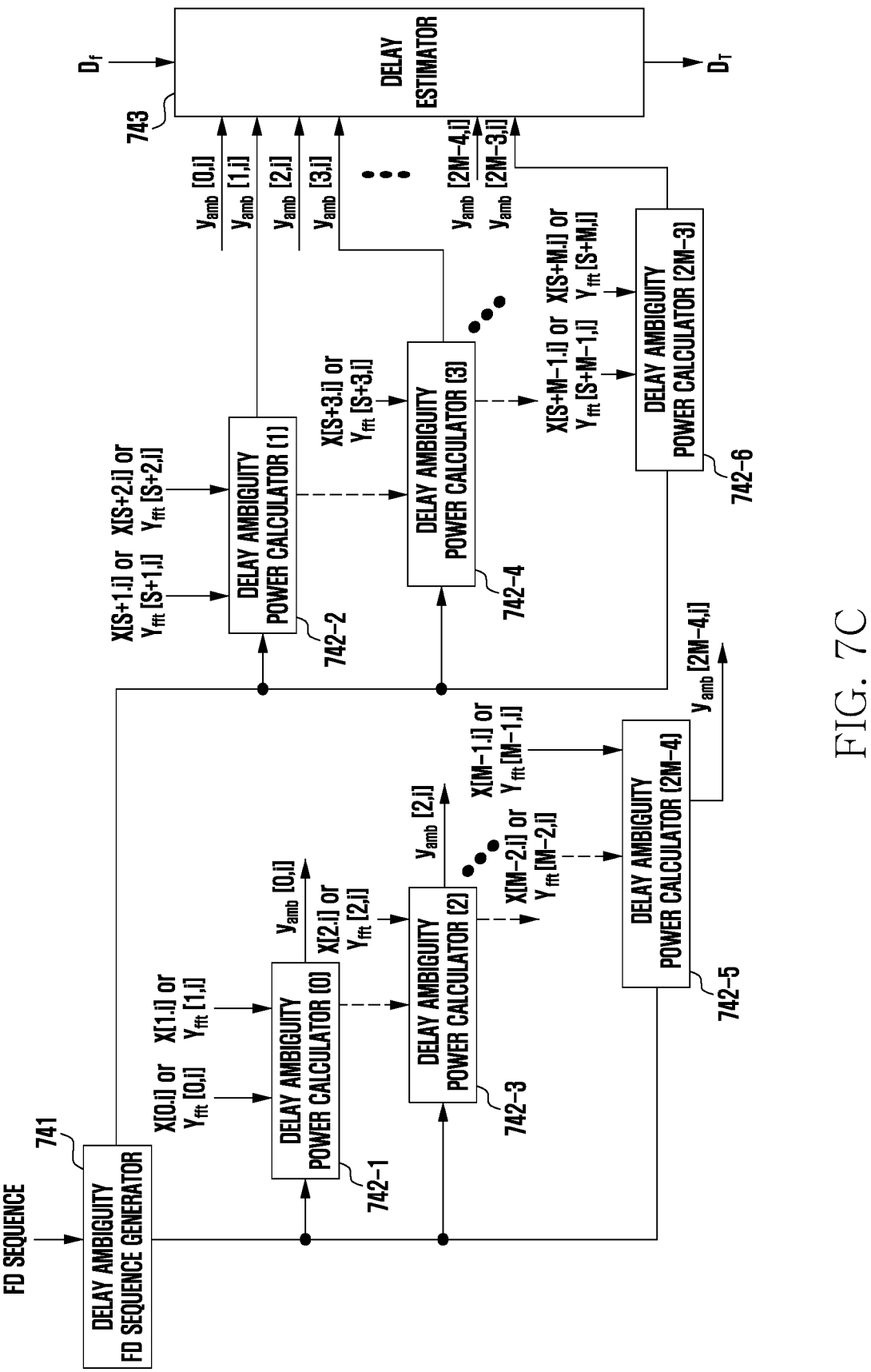
FIG. 7C is a diagram illustrating a configuration of a delay ambiguity detector of FIG. 7A according to an embodiment of the disclosure.

FIG. 7A is a diagram illustrating a configuration of a PRACH detector when extending to an M preamble symbol according to an embodiment of the disclosure. FIG. 7B is a diagram illustrating a configuration of a coverage extension detector of FIG. 7A according to an embodiment of the disclosure. FIG. 7C is a diagram illustrating a configuration of a delay ambiguity detector of FIG. 7A according to an embodiment of the disclosure.

Referring to FIG. 7A, the PRACH detector may include a preamble symbol unit data generator 710, an N FFT processor 720, a coverage extension detector 730, a delay ambiguity detector 740, a preamble determiner 750, and a sequence generator 760.

The preamble symbol unit data generator 710 may be configured to convert the preamble transmitted from the terminal to the RACH into data of symbol unit as described with reference to FIG. 4. Since the delay extends up to M preamble symbol units in the embodiments of the disclosure, the case that the symbols of the preamble unit illustrated in FIG. 4 are received in the form of symbol units up to Psymbol(0) 711, Psymbol(1) 712, Psymbol(3) 713, Psymbol (S) 714, Psymbol(S+1) 715, Psymbol(S+M−1) 716, Psymbol(S+M) 717 is described.

Looking further at this process in comparison with FIG. 4 described above, there is a difference as follows. Referring to FIG. 4, only the delay within the standard specification, for example, within a length of one preamble symbol may be allowed. Accordingly, the data of the preamble symbol unit illustrated in FIG. 4 are illustrated for Psymbol(0) (411), Psymbol(1) 412, Psymbol(3) 413, Psymbol(S) 414, Psymbol(S+1) 415, Psymbol(S+2) 416, and Psymbol(S+3) 417, and a receiver of the base station only needs to receive and process the symbols from Psymbol(1) 441 to Psymbol(S) 443 practically.

However, in the disclosure, in order to receive a signal in the case of delaying up to M preamble symbol units, the configuration of data are changed to receive the preamble signals up to Psymbol(0) 711, Psymbol(1) 712, Psymbol(3) 713, Psymbol(S) 714, Psymbol(S+1) 715, Psymbol(S+M−1) 716, and Psymbol(S+M) 717. Further, Psymbol(0) 711, which is a symbol of the first preamble unit, may become a preamble symbol corresponding to the CP. The preamble symbol corresponding to the CP part may not be processed by the N FFT processor 721 because it includes a value of 0 (zero) as described above, and it may be configured not to be input to the coverage extension unit 730 after processing by the N FFT processor 721.

In expressing each preamble symbol as Psymbol(s), the received signal may be expressed as x[s,i], wherein 's' is a Psymbol index ranging from 0 to S+M, 'S' means the number of preamble symbols excepting CP, and 'I' has a range from 0 to N−1.

When detecting only up to the length of one preamble symbol unit, it may have a form of receiving the symbol of the preamble unit only from Psymbol(1) 712 to Psymbol(S) 714. It may be seen from FIG. 7A that the diagram corresponds to a case of extending up to the length of M preamble symbols or more. Accordingly, the size of the preamble symbol unit data generator 710 may be determined according to determining to what level the base station extends the symbol length of the preamble transmitted by the terminal.

Data generated in units of preamble symbols by the preamble symbol unit data generation unit 710 may be input to the N FFT processing unit 720.

When one preamble symbol is input, each of the N FFT processors 721, 722, 723, 724, 725, 726 and 727 of the N FFT processing unit may convert the received time-domain signal to a frequency-domain signal. As such, each of the N FFT processors 721, 722, 723, 724, 725, 726 and 727 may convert the time-domain signal into the frequency-domain signal and provide the same to the coverage extension detector 730. When the output of the N FFT processor is referred to as $y_{fft}[s,i]$, 's' is a preamble symbol index having a value from 0 to S+M, and 'i' may have a value from 0 to N−1, which is the number of subcarriers forming one preamble symbol. Further, 'S' may be the number of preamble symbols excluding CP.

The coverage extension detector 730 may receive the output of each of the N FFT processors 721, 722, 723, 724, 725, 726 and 727 to calculate the position information of the preamble symbol having the maximum energy and the power of the preamble symbol so as to provide the same to the preamble determiner 750. Further, the coverage extension detector 730 may provide a fractional delay $(D_F)$ value to the delay ambiguity detector 740.

The sequence generator 760 may generate and output a preamble sequence transmitted by the terminal. Such a sequence generator 760 may be implemented as an apparatus for generating a frequency-domain (FD) sequence or may be implemented as an apparatus for generating a time-domain (TD) sequence. The sequence generated by the sequence generator 760 may be input to the coverage extension detector 730 and the delay ambiguity detector 740. In this disclosure, description will be made, for example, of a case of the sequence generator 760 being implemented as an apparatus for generating a frequency-domain (FD) sequence transmitted by the terminal. The frequency-domain (FD) sequence output from the sequence generator 760 may output a value of $s_{fd}[i]$, wherein 'i' is the number of subcarriers forming one preamble symbol having a value from 0 to N−1.

Then, the configuration and operation of the coverage extension detector 730 will be described with reference to FIG. 7B.

First, the outputs of the remaining N FFT processors 722, 723, 724, 725 and 726 except for the outputs of the N FFT processors 721 and 727 processing CP and Psymbol (S+M), amongst the N FFT processors 721, 722, 723, 724, 725, 726 and 727 described in FIG. 7A, may be input to the symbol power calculators 731-1, 731-2, 731-3, 731-4 and 731-5, respectively. Referring to FIG. 7B, (S+M)-th preamble symbol is of a format which no symbol power calculator is allocated thereto. It is because the non-coherent sum calculators 732-1, 732-2 and 732-3 use only up to S+M−1. The output from the N FFT processor 727 transforming the (S+M)-th preamble is used only by the delay ambiguity detector 740.

Each of the symbol power calculators 731-1, 731-2, 731-3, 731-4 and 731-5 may be configured to include a sequence correlator, an N IFFT processor and a power calculator as described above in FIG. 3B. Therefore, an operation of each of the symbol power calculators 731-1, 731-2, 731-3, 731-4 and 731-5 will be described using the configuration of FIG. 3B.

The output of the sequence generator 760 may be input to the respective symbol power calculators 731-1, 731-2, 731-3, 731-4 and 731-5. Specifically, the input of the sequence generator 760 may be input to the sequence correlator 312 of the symbol power calculator as illustrated in FIG. 3B.

The sequence correlator 312 may calculate a correlation between the N FFT-processed frequency-domain preamble symbol and the frequency-domain sequence input from the sequence generator 760 to output the same. Calculating the correlation between the N FFT-processed frequency-domain preamble symbol in the sequence correlator 312 and the frequency-domain sequence input from the sequence generator 760 may be in the form of multiplying the two signals. The output of the sequence correlator 312 may be referred to as $y_{corr}[s,i]$, wherein 's' may have a value from 1 to S+M−1, and 'i' may have a value from 0 to N−1 as described above.

A value for which the correlation is calculated by the sequence correlator 312 may be input to the N IFFT processor 313. The N IFFT processor 313 may convert a frequency-domain signal into a time-domain signal by performing an N-sized Inverse Fourier Fast Transform (N IFFT). The output of the N IFFT processor 313 may be referred to as $y_{ifft}[s,i]$, wherein 's' may also have a value from 1 to S+M−1, and 'i' may also have a value from 0 to N−1 as described above.

The signal converted into a time-domain signal by the N IFFT processor 313 may be input to the power calculator 314. The power calculator 314 may calculate the power of the sample included in each preamble symbol by squaring an absolute value of a complex number. Describing the output calculated by the power calculator 314 in the manner described above, it may be referred to as $y_{pow}[s,i]$. Here again, 's' may have a value from 1 to S+M−1, and 'i' may have a value from 0 to N−1 as described above.

Referring to FIG. 7B, the symbol power value calculated in the manner as described above may be input to the non-coherent sum calculators 732-1, 732-2 and 732-3. The non-coherent sum calculators 732-1, 732-2 and 732-3 may provide an output added by S for each sample. For example, one non-coherent sum calculator may provide the output after adding the power value for each sample to samples as many as S corresponding to the length of the preamble symbol. Further, since the non-coherent sum calculators 732-1, 732-2 and 732-3 calculate the power for samples as much as S, which is the length of the preamble symbol, each input symbol may be input with shifting one by one.

Describing this process with reference to FIG. 7B, the first non-coherent sum calculator(0) 732-1 may calculate and output a sum of the powers from the first preamble symbol to S-th preamble symbol among the preamble symbols excluding the CP. For example, the input to the first non-coherent sum calculator(0) 732-1 may include inputs from the power calculated for the first preamble symbol up to the power calculated for the S-th preamble symbol.

The second non-coherent sum calculator (1) 732-2 may calculate and output a sum of the powers from the second preamble symbol up to (S+1)-th preamble symbol among the preamble symbols excluding the CP. For example, the input to the second non-coherent sum calculator (1) 732-2 may include inputs from the power calculated for the second preamble symbol to the power calculated for the (S+1)-th preamble symbol.

The last non-coherent sum calculator(M−1) 732-3 may calculate and output a sum of the powers from M-th preamble symbol up to (S+M−1)-th preamble symbol among the preamble symbols excluding the CP. For example, the input to the last non-coherent sum calculator(M−1) 732-3 may include inputs from the power calculated for the M-th preamble symbol up to the power calculated for the (S+M−1)-th preamble symbol.

For the inputs to the non-coherent sum calculators 732-1, 732-2 and 732-3 described above, the input of the non-coherent sum calculator (r) may be referred to as $y_{pow}[s, i]$ according to those illustrated in FIG. 7B, wherein 's' may also have a value from r+1 to r+S.

Further, as described in the prior art, the state-of-the art base stations and terminals may transmit signals using a plurality of antennas. For example, a signal may be transmitted and received using a multiple-input multiple-output (MIMO) scheme. Accordingly, a preamble signal may also be transmitted in the MIMO scheme. As such, the above-described process should be performed for each antenna in the base station. Further, as the above process is performed for each antenna, it is necessary to combine signals at the same position received corresponding to each antenna. Thus, according to the disclosure, the base station may have a configuration in which the powers of the preamble signals received at the same position via the antenna couplers 733-1, 733-2 and 733-3 are combined for each antenna. If it is a system using only a single antenna, it would be apparent to those skilled in the art to implement the system without such an antenna coupler.

The antenna couplers 733-1, 733-2 and 733-3 may calculate the sum of the preamble symbols received at the same position. Assuming that there are two antennas in the system, a brief description thereof will be made as follows.

The first antenna coupler 733-1 may provide an output by adding a non-coherent sum from the first preamble symbol received from the first antenna to the S-th preamble symbol and a non-coherent sum from the first preamble symbol received from the second antenna to the S-th preamble symbol.

Further, the second antenna coupler 733-2 may provide an output by adding a non-coherent sum from the second preamble symbol received from the first antenna to the (S+1)-th preamble symbol and a non-coherent sum from the second preamble symbol received from the second antenna to the (S+1) preamble symbol.

It is to be noted that such using of two antennas in the disclosure is merely for convenience of description, and when three or more antennas are used, a value obtained by adding their corresponding non-coherent sums is used.

The output of each of the antenna couplers 733-1, 733-2, and 733-3 may be input to a maximum energy detector 734. The maximum energy detector 734 may determine a non-coherent sum calculator having the maximum energy. In case of the maximum energy detector 734 determining the non-coherent sum calculator having the maximum energy, it may be consequently used as a basis for determining when the actual preamble signal has been transmitted within the preamble symbol. Accordingly, the maximum energy detector 734 may determine the delay $D_F$. For example, the maximum energy detector 734 may determine a sample index value of a preamble symbol for the corresponding antenna coupler based on the output of the antenna coupler having the maximum power. As such, it is possible to determine at which point in time the preamble has been received within the preamble symbol, based on the determination of the maximum energy detector 734.

In this context, when the system is configured with only one non-coherent sum calculator, a switch may be provided at an output terminal of each symbol power calculator. Therefore, the symbol power value calculated corresponding to the corresponding timing point may be input to the non-coherent sum calculator. For example, in the case of the operation of the first non-coherent sum calculator (0) 732-1, the output of the symbol power calculator may be limited to calculate the non-coherent sum only with the input of the symbol power calculators 731-1, 731-2 and 731-3 for the sum of power from the first preamble symbol to the S-th preamble symbol of the symbol power calculators 731-1, 731-2, 731-3, 731-4 and 731-5. Further, this process enables the powers from the power calculated for the first preamble symbol up to the power calculated for the S-th preamble symbol to be input. This process may limit the inputs of the symbol power calculators (using the inputs of the symbol power calculators 731-2, 731-3 and 731-4) so that even the second non-coherent sum calculator 732-2 has the same form.

The antenna coupler may receive, as its input, the non-coherent sum for each antenna only with respect to the first preamble symbol to the S-th preamble symbol outputted for each antenna and provide, as its output, a total of the non-coherent sums added by as much as the number of antennas. Accordingly, M number of antenna couplers 733-1, 733-2 and 733-3 may exist, wherein M is the number of the non-coherent sum calculators 732-1, 732-2 and 732-3. Further, the antenna coupler may be configured to receive as an input the non-coherent sum for each antenna from the second preamble symbol to the (S+1)-th preamble symbol at the time of the preamble symbol thereafter, and to output a total sum corresponding to the number of antennas. In this context, the antenna coupler and/or each non-coherent sum calculator may be configured to output a starting symbol index value of the current calculated preamble symbol together, thereby making it possible to identify at which point in time the power value is calculated for the preamble symbol.

Meanwhile, a block for calculating a coherent sum before calculation of its power may be further added to the above configuration according to the operation of the PRACH detector, but for simplicity of description, it will be omitted from this disclosure.

Next, the configuration and operation of the delay ambiguity detector 740 will be described with reference to FIG. 7C.

The output of the frequency-domain (FD) sequence generator 760 described above may generate a preamble sequence transmitted by the terminal and provide the generated preamble sequence to the delay ambiguity detector 740 as an input. Specifically, the input of the FD sequence generator 760 may be fed to a delay ambiguity FD sequence generator 741. The delay ambiguity FD sequence generator 741 may receive, as an input, a preamble sequence transmitted by the terminal to generate a frequency-domain sequence for detecting its delay ambiguity. If the sequence generated by the delay ambiguity FD sequence generator 741 is taken as $s_{fdamba}[j]$, then 'j' may generate a sequence having a value of 0 to 2N−1. The output of delay ambiguity FD sequence generator 741 may be input to delay ambiguity power calculators 742-1, 742-2, 742-3, 742-4, 742-5 and 742-6 as illustrated in FIG. 7C.

The delay ambiguity power calculators 742-1, 742-2, 742-3, 742-4, 742-5 and 742-6 may receive, as an input, values of two different adjacent preamble symbols, respectively. Describing it further, the delay ambiguity power calculator(0) 742-1 may have as an input the preamble symbols of Psymbol(0) and Psymbol(1) illustrated in FIG. 7A. Further, the delay ambiguity power calculator (2) 742-3 may have as an input the preamble symbols of Psymbol(1) and Psymbol(2) illustrated in FIG. 7A. In this sequence, the system may receive the preamble symbols received later by one preamble symbol, sequentially from each preamble symbol including the CP. For convenience of description in the following embodiments of the disclosure, the CP part illustrated above will be described assuming that it has a C2 format. However, it will be apparent to those skilled in the art that the same may be applied even to any other case than the C2 format.

Therefore, the delay ambiguity power calculator (2M−4) 742-5 may have the preamble symbols of Psymbol(M−2) and Psymbol(M−1) as inputs. This configuration may be to identify from which position the preamble symbol is received in the input section of the preamble symbol in order to resolve delay ambiguity. Since it is assumed that FIGS. 7A to 7C describe a case that a delay up to M preamble symbols is allowed, it is possible to calculate the power received in the preceding section up to the preamble symbol for which the delay is allowed, in order to identify from which position the preamble symbol is received.

For example, it is described that the delay ambiguity power calculator(0) 742-1 may have as inputs the preamble symbols of Psymbol(0) 711 and Psymbol(1) 712 illustrated in FIG. 7A. The preamble symbols of Psymbol(0) 711 and Psymbol(1) 712 illustrated in FIG. 7A may be used to generate DAsymbol[0,0] 521. Accordingly, the delay ambiguity power calculator (0) 742-1 may calculate the energy for Psymbol(s) 601 and Psymbol(s+1) 602 described with reference to FIG. 6, as seen in a reference numeral 610.

Further, it is described that the delay ambiguity power calculator(2) 742-3 may have as inputs the preamble symbols of Psymbol(1) 712 and Psymbol(2) 713 illustrated in FIG. 7A. The preamble symbols of Psymbol(1) 712 and Psymbol(2) 713 illustrated in FIG. 7A may be used to generate DAsymbol[1,0] 525. Accordingly, the delay ambiguity power calculator(1) 742-3 may calculate the energy for Psymbol(s) 601 and Psymbol(s+1) 602 described in FIG. 6, as seen in the reference numeral 610.

The power value calculated in the delay ambiguity power calculator(0) 742-1 is illustrated in FIG. 7C as the value of $y_{amb}[0,i]$, and is input to the delay estimator 743. The delay estimator 743 may detect a value with higher energy based on the power value calculated by the delay ambiguity power calculator(0) 742-1 and the delay ambiguity power calculator(1) 742-2 as described above, thereby identifying whether the actual transmission is either delayed by "$D_F$" or delayed by "$D_F$+N".

To explain this process once again with another example, the delay ambiguity power calculator 2r may calculate the energy with consecutive neighboring symbols to follow, including $DA_{symbol}[r,0]$, in the same manner as described with reference to FIG. 6. Further, the delay ambiguity power calculator 2r+1 may calculate the energy with consecutive neighboring symbols to follow, including $DA_{symbol}[r+1,S]$, in the same manner as described with reference to FIG. 6. The delay estimator 743 may use these values to identify a delay.

If there is a delay by the symbol length in a 2 preamble symbol section, received power of the first delay ambiguity power calculator (0) 742-1 is "0 (zero)" or may have a value close to "0". Further, the power value calculated by the delay ambiguity power calculator(2) 742-3 is shown as the value of $y_{amb}[2,i]$ in FIG. 7C and is input to the delay estimator 743.

Further, since the number of preamble symbols of the delay ambiguity power calculator(1) 742-2 is S, it can calculate the power of consecutive symbols received after S preamble symbols. This process is to know more precisely how much the preamble symbol length is delayed in addition to the power calculation value detected only in the front part of the preamble symbol. Further, the delay ambiguity power calculator(1) 742-1 may have preamble symbols of Psymbol (S+1) and Psymbol(S+2) as inputs. The power value calculated by the delay ambiguity power calculator(1) 742-2 is shown in FIG. 7C as a value of $y_{amb}[1,i]$, and is input to the delay estimator 743. Further, the power value calculated by the delay ambiguity power calculator(3) 742-4 is shown in FIG. 7C as a value of $y_{amb}[3,i]$, and is also input to the delay estimator 743.

The delay estimator 743 may use the received input to determine whether the delay is $D_F$ or $D_F$+N or $D_F$+2N, and so on. The operation of the delay estimator 743 using the method according to the disclosure will be described below.

Hereinafter, it is assumed that the CP has a C2 format. In this context, it is assumed that AmbA is "DAsymbol[0,0] (521)+DAsymbol[0,1] (522)+DAsymbol[0,2] (523)+ . . . +DAsymbol[0,S] (524)" described in FIG. 5. And AmbB may be "DAsymbol[1,0] (525)+DAsymbol[1,1] (526)+ DAsymbol[1,2] (527)+ . . . +DAsymbol[1,S] (528)". In this case, the delay estimator 743 may determine that the case having a larger energy value of AmbA and AmbB indicates that the actual PRACH has been transmitted.

In a preferred embodiment of the disclosure, the fact that in AmbA and AmbB, DAsymbol[0,1] (522)+DAsymbol[0, 2] (523)+ . . . +DAsymbol[0,S] (524) corresponding to AmbA and DAsymbol[1,0] (525)+DAsymbol[1,1] (526)+ DAsymbol[1,2] (527)+ . . . +DAsymbol[1,S−1] corresponding to AmbB. are common may be used. For example, the delay estimator 743 can obtain the same effect by comparing only the energy values of the remaining parts except for the common part. Therefore, the delay estimator 743 may set AmbA to DAsymbol[0,0] (521) and AmbB to DAsymbol [1,S] (528) to compare the two values, thereby determining whether it is a delay of "$D_F$" or a delay of "$D_F$+N".

As another example, further looking at the case of comparing the delay of "$D_F$" and the delay of "$D_F$+3N", the delay estimator 743 may set AmbA as before. And the delay estimator 743 may set AmbB as up to "DAsymbol[3,0]+ DAsymbol[3,1]+ . . . +DAsymbol[3,S]". Then, if it is inferred using FIG. 5, then AmbA and AmbB may be summarized only with the parts having the difference as follows.

$$AmbA = DAsymbol[0,0] + DAsymbol[0,1] + DAsymbol[0,2]$$

$$AmbB = DAsymbol[3,S-2] + DAsymbol[3,S-1] + DAsymbol[3,S]$$

Therefore, the delay estimator 743 may identify (or determine) whether the PRACH received from the electronic device (terminal) is a delay of "$D_F$" or a delay of "$D_F$+3N", using AmbA and AmbB set only with the different parts as described above.

Further, the scheme of calculating the power in each of the delay ambiguity power calculators 742-1, 742-2, 742-3, 742-4, 742-5 and 742-6 as described above may use one of the following two methods.

First, each of the delay ambiguity power calculators 742-1, 742-2, 742-3, 742-4, 742-5 and 742-6 calculates the power of two adjacent preamble symbols, so the delay ambiguity FD sequence generator 741 will also have to generate and output a sequence corresponding to two preamble symbols.

Further, each of the delay ambiguity power calculators 742-1, 742-2, 742-3, 742-4, 742-5 and 742-6 may receive, as inputs to the two adjacent preamble symbols, either Fourier transformed symbols or no Fourier transformed symbols.

First, when no Fourier transformed symbols are used as inputs, it is possible to use inputs from the preamble symbol unit generators 711, 712, 713, 714, 715, 716 and 717 of the preamble symbol unit data generation unit 710. These input values may be x[s,i] and x[s+1,i], respectively.

As another example, when Fourier-transformed symbols are input, Fast Fourier-transformed value output from each of the N FFT processors 721, 722, 723, 724, 725, 726 and 727 may be used as inputs. These input values may be values that are Fast Fourier transformed into $y_{fft}[s,i]$ and $y_{fft}[s+1,i]$.

For both of the above two cases, it may have a value of $$s = \left\lfloor \frac{d}{2} \right\rfloor + S \cdot (d \,\&\, 1),$$

$$i = 0 \sim N - 1$$

wherein, 'd' denotes an index of the delay ambiguity power calculator.

The delay estimator 743 may receive the output value of each of the delay ambiguity power calculators 742-1, 742-2, 742-3, 742-4, 742-5 and 742-6, as discussed above. In addition, as described above with reference to FIG. 7A, it may use the $D_F$ value calculated by the coverage extension detector 730 to determine (or estimate) by how many symbols the preamble signal is delayed in reception. For example, the delay estimator 743 may estimate the delay (m) in a unit of preamble symbols.

When taking the delay estimated by the delay estimator 743 as $D_T$, this $D_T$ may be a sum (i.e., $D_T = m \times N + D_F$) of the value obtained by multiplying the delay (m) in a unit of preamble symbols by N, and the $D_F$ value.

Here, 'N' is the number of samples forming one preamble symbol, 'm' is a delay in a unit of preamble symbols, and 'DF' is a fractional delay indicating a delay within a preamble symbol.

Referring back to FIG. 7A, the preamble determiner 750 may use the maximum energy value output from the coverage extension detector 730 and the estimated delay $D_T$ value output from the delay ambiguity detector 740 to determine whether the preamble has been received. For example, the preamble determiner 750 may determine whether the preamble has received by comparing the maximum energy output from the coverage extension detector 730 with a preset threshold value.

The preamble determiner 750 may determine that the preamble has been received, when the maximum energy received from the coverage extension detector 730 is greater than the preset threshold. On the contrary, when the maximum energy received from the coverage extension detector 730 is less than or equal to the preset threshold, the preamble determiner 750 may determine that there is no signal.

Figure 8A:
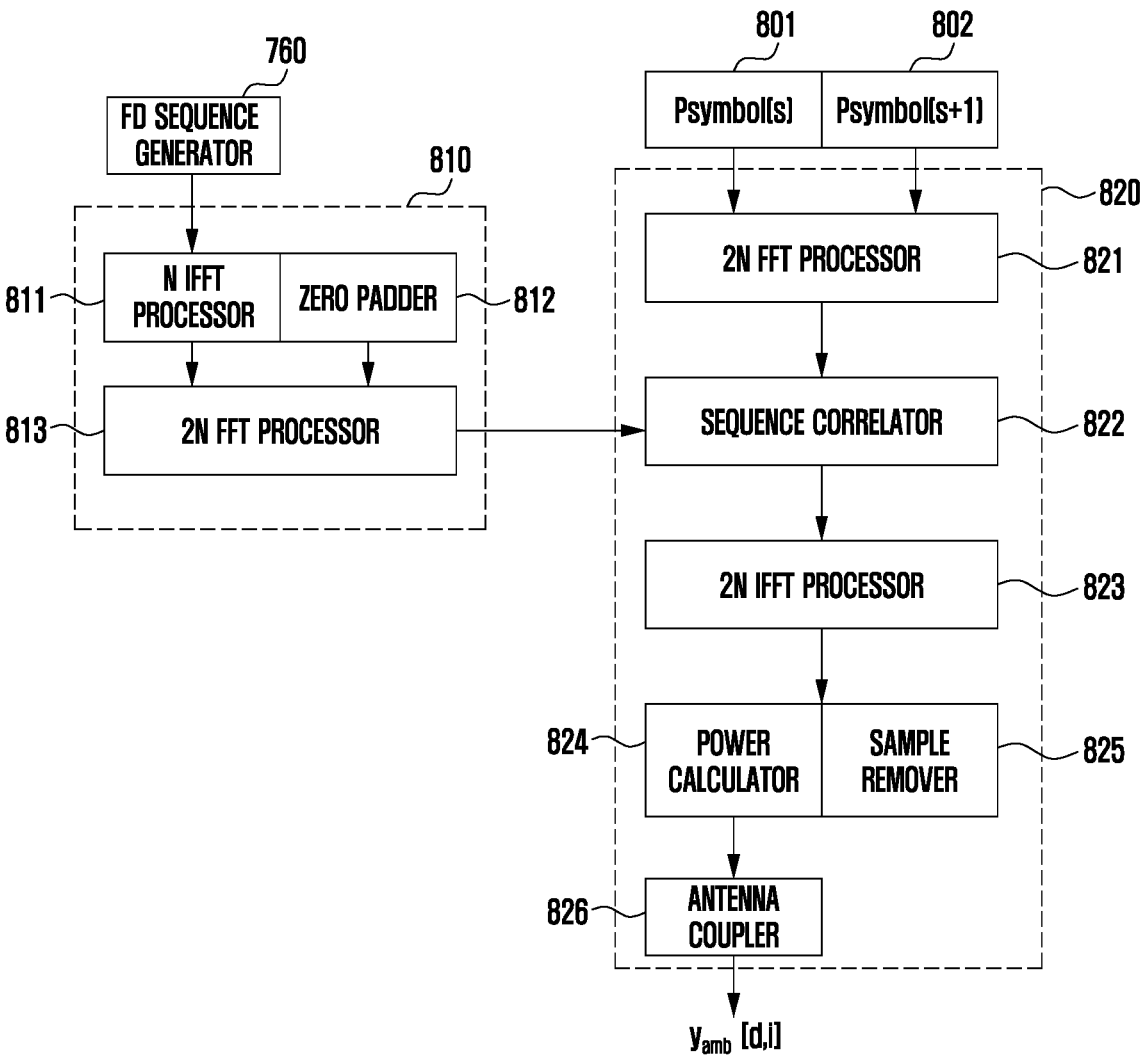
FIG. 8A is a diagram illustrating a configuration of a delay ambiguity FD sequence generator and a delay ambiguity power calculator according to an embodiment of the disclosure.

FIG. 8A is a diagram illustrating a configuration of a delay ambiguity FD sequence generator and a delay ambiguity power calculator according to an embodiment of the disclosure. In FIG. 8A, the FD sequence generator 760 of FIG. 7A is described through the same reference numerals, and a Psymbol(s) generator 801 and a Psymbol(s+1) generator 802 are described through new reference numerals.

A delay ambiguity FD sequence generator 810 may correspond to one embodiment making up the delay ambiguity FD sequence generator 741 described with reference to FIG. 7C. Further, the power delay ambiguity calculators 742-1, 742-2, 742-3, 742-4, 742-4, 742-5 and 742-6 may all have the same configuration. In FIG. 8A, a reference numeral 820 is used for one power delay ambiguity calculator. Accordingly, when the power delay ambiguity calculators of FIG. 7C are implemented according to the embodiment of FIG. 8A, they may have the configuration as in the reference numeral 820.

First, looking at the configuration of the delay ambiguity FD sequence generator 810, it may include an N IFFT FD processor 811, a zero padder 812, and a 2N FFT processor 813. The FD sequence generator 760 may generate and output an N FFT-processed FD sequence. The output of the FD sequence generator 760 may be expressed as $s_{fd}[i]$. Here, as described above, 'I' may also have a value from 0 to N−1. For example, an N-sized FD sequence is generated and output.

The N IFFT processor 811 may convert the output of the FD sequence generator 760 into a time-domain signal and output the same. The output converted to the time-domain by the N IFFT processor 811 may be input to the 2N FFT processor 813.

The zero padder 812 may insert N zeros (0) to provide the same to the 2N FFT processor 813 together with the output of the N IFFT processor 811.

The 2N FFT processor 813 that takes the output of the N IFFT processor 811 and the output of the zero padder 812 as inputs may generate an FD sequence of 2N length to provide it to the power delay ambiguity calculator. The reason for not using the FD sequence generator 760 as it is, is as follows.

The delay ambiguity power calculators 742-1. 742-2, 742-3, 742-4, 742-5 and 742-6 described above with reference to FIG. 7C take two adjacent preamble symbols as inputs. Therefore, the output of the delay ambiguity FD sequence generator 810 should have the form corresponding to the input of the delay ambiguity power calculator 820, i.e. the same length, and thus, the delay ambiguity FD sequence generator is implemented by padding zero values that do not affect the power. The FD sequence generated by the delay ambiguity FD sequence generator 810 may be output as $s_{fdamb}[j]$. In this case, 'j' may have a value from 0 to 2N−1. For example, an FD sequence having a length of 2N may be generated.

The power delay ambiguity calculator 820 takes two adjacent preamble symbols as described with reference to FIG. 7C, as inputs. Accordingly, it is possible to receive preamble symbols from the Psymbol(s) generator 801 and the Psymbol(s+1) generator 802 that process the two adjacent preamble symbols. More specifically, the 2N FFT processor 821 of the power delay ambiguity calculator 820 may receive respective preamble symbols from the Psymbol (s) generator 801 and the Psymbol(s+1) generator 802.

The 2N FFT processor 821 may convert the signal in the time-domain received from each of the symbol generators 801 and 802 into the signal in the frequency-domain. In this case, the signal corresponds to the length of two preamble symbols, so the 2N FFT processor 821 may convert the two preamble symbols into the signal in the frequency-domain at a time.

The sequence correlator 822 may calculate correlation between the signal in the frequency-domain corresponding to the length of two preamble symbols received from the 2N FFT processor 821 and the output of the delay ambiguity FD sequence generator 810. Calculating the correlation with respect to the signal output from the 2N FFT processor 821 and the output signal of the delay ambiguity FD sequence generator 810 may be obtained by multiplying a conjugate of the delay ambiguity FD sequence generator 810 and the output of the 2N FFT processor 821.

Since the signal subjected to the correlation processing in the sequence correlator 822 is correlation processed using two signals having a length of 2N, it is a signal having a length of 2N. Accordingly, the 2N IFFT processor 823 may convert the output of the sequence correlator 822 back to the time-domain signal. Since the input of the 2N IFFT processor 823 has a length of 2N, it is performed an IFFT of the length of 2N.

N outputs from the beginning amongst the outputs of the 2N IFFT processor 823 may be input to the power calculator 824, and the remaining N inputs may be input to the sample remover 825. The power calculator 824 may calculate the power of the sample by squaring an absolute value of the complex number with respect to the N inputs.

Further, the sample remover 825 may cancel the input. This is because only 0 to N−1 samples are required as described in FIG. 6. Therefore, the removal of the input of the sample remover 825 may be a process of removing as many as N number of samples to follow, because only 0 to N−1 samples are required.

The antenna coupler 826 may receive the output of the power calculator 824 to calculate a sum of the powers calculated for each antenna. The antenna coupler 826 may perform the same form of calculation as the antenna couplers 733-1, 733-2 and 733-3 described above with reference to FIG. 7B. The output of the antenna coupler 826 may be input to the delay estimator 743 as described with reference to FIG. 7C.

Figure 8B:
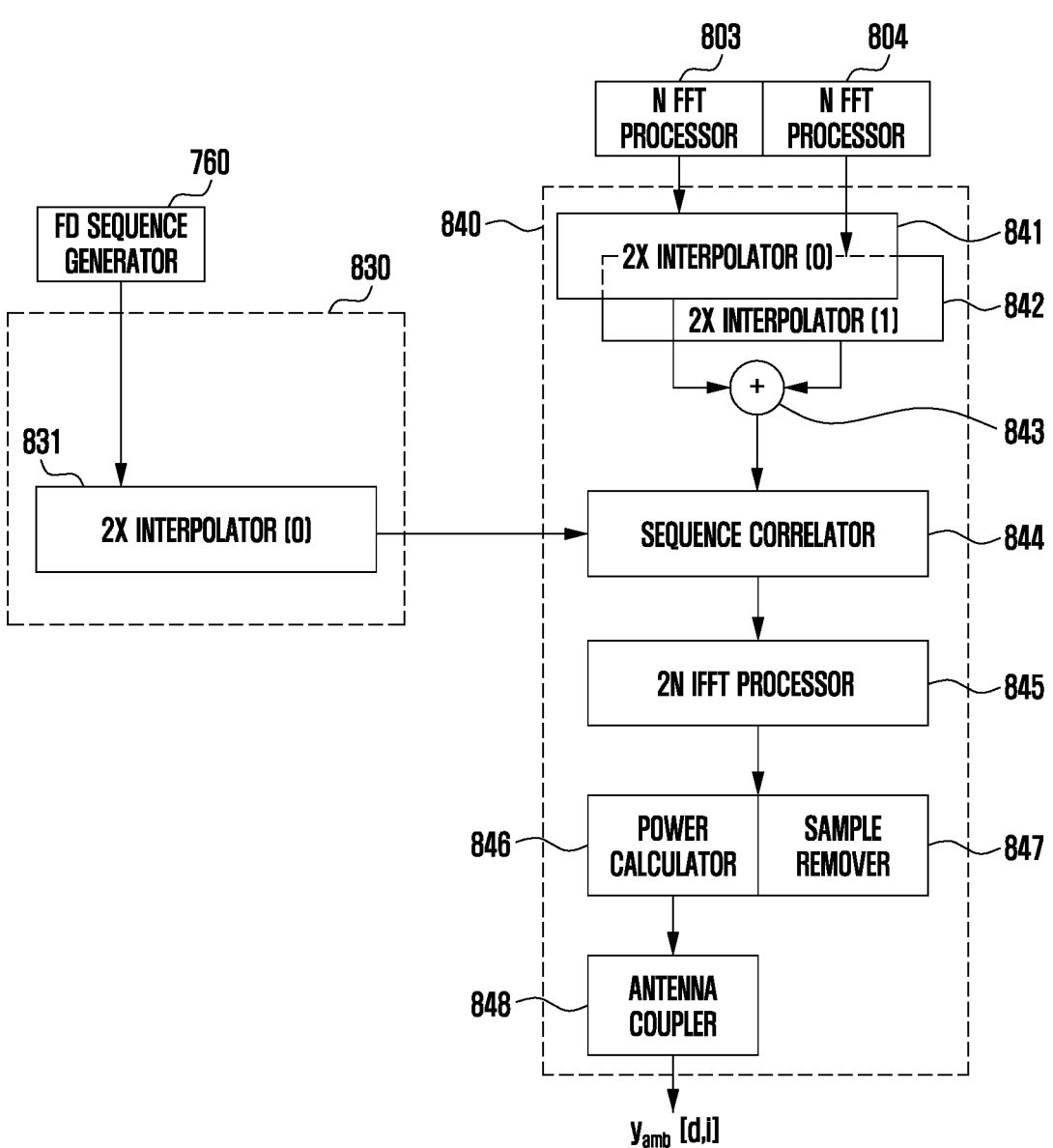
FIG. 8B is a diagram illustrating a configuration of a delay ambiguity FD sequence generator and a delay ambiguity power calculator according to an embodiment of the disclosure.

FIG. 8B is a diagram illustrating a configuration of a delay ambiguity FD sequence generator and a delay ambiguity power calculator according to an embodiment of the disclosure.

Referring to FIG. 8B, the FD sequence generator 760 described with reference to FIG. 7A uses the same reference numerals, and new reference numerals are used for N FFT processors 803 and 804.

A delay ambiguity FD sequence generator 830 illustrated in FIG. 8B may correspond to one embodiment implementing the delay ambiguity FD sequence generator 741 described in FIG. 7C. Further, the power delay ambiguity calculators 742-1, 742-2, 742-3, 742-4, 742-5 and 742-6 may all have the same configuration as described above. In FIG. 8B, as previously described with reference to FIG. 8A, a reference numeral 840 is used for one power delay ambiguity calculator. Accordingly, when the power delay ambiguity calculators of FIG. 7C are implemented according to the embodiment of FIG. 8B, they may have the configuration as in the reference numeral 840.

Then, looking at the configuration of the delay ambiguity FD sequence generator 830, this delay ambiguity FD sequence generator 830 may be implemented with a double (2×) interpolator(0) 831 as described in FIG. 8A. The delay ambiguity FD sequence generator 830 may receive the output of the FD sequence generator 760 $s_{fd}[i]$. The delay ambiguity FD sequence generator 830 may perform interpolation based on $s_{fd}[i]$, generate a sequence of a frequency-domain sequence, and output the generated sequence in order to detect delay ambiguity. the output of the FD sequence generator 760 is $s_{fd}[i]$, then 'i' may have a value from 0 to N−1 as described above and N is a natural number. If the output from the double interpolator (0) 831 is $s_{fdamba}[j]$, then 'j' may have a value from 0 to 2N−1 as described above with reference to FIG. 8A and N is a natural number. In other words, the double interpolator (0) 831 may generate an FD sequence having a length of 2N. If the output sequence of the double interpolator (0) 831 is $s_{fdamba}[j]$, then j may have a value from 0 to 2N−1 and N is a natural number.

Referring to FIG. 8A, the outputs from the Psymbol(s) generator 801 and the Psymbol(s+1) generator 802 were used as inputs of the delay ambiguity power calculator 820. However, in the embodiment of FIG. 8B, the output of the N FFT processors 803 and 804 may be used as an input of the delay ambiguity power calculator 840.

The power delay ambiguity calculator 820 takes two adjacent preamble symbols as inputs as described with reference to FIG. 7C. Accordingly, preamble symbols may be received from the N FFT processors 803 and 804 that process two adjacent preamble symbols. Specifically, it may be input to two different 2× interpolators 841 and 842 of the power delay ambiguity calculator 820.

The 2× interpolator(0) 841 may take the output of the N FFT processor 803 as an input, and the 2× interpolator(1) 842 may take the output of the N FFT processor 804 as an input, respectively, thereby performing the interpolation so that they become twice the length respectively. Specifically, the 2× interpolator(0) 841 may interpolate $y_{fft}[s,i]$ output from the N FFT processor 803 to output it, and the 2× interpolator(1) 842 may interpolate the $y_{fft}[s+1]$ output from the N FFT processor 804 to output it. Here, the value of 's' may be, as discussed above:

$$s = \left\lfloor \frac{d}{2} \right\rfloor + S \cdot (d \,\&\, 1),$$

$$i = 0 \sim N - 1,$$

wherein 'N' is a natural number.

An adder 843 may add the output value of the 2× interpolator(0) 841 and the output value of the 2× interpolator(1) 842, and provide it to a sequence correlator 844.

The sequence correlator 844 may calculate correlation by taking the respective outputs of the 2× interpolator(0) 831 and the adder 843 as inputs. Calculating the correlation between the signal output from the 2× interpolator(0) 831 and the output signal of the adder 843 may be obtained from multiplication by the output of the conjugate adder 843 of the 2× interpolator(0) 831.

The signal subjected to the correlation process in the sequence correlator 844 is a signal with a length of 2N because the correlation processing is performed using two signals with the length of 2N. Accordingly, the 2N IFFT processor 845 may convert the output of the sequence correlator 844 back into the time-domain signal. Since the input of the 2N IFFT processor 845 has the length of 2N, an IFFT of length of 2N is performed.

N outputs from the beginning from the beginning amongst the outputs of the 2N IFFT processor 823 may be input to a power calculator 846, and the remaining N outputs may be input to a sample remover 847. The power calculator 846 may calculate the power of the sample by squaring an absolute value of a complex number with respect to the N inputs.

The sample remover 847 may also cancel the input. This is because only 0 to N−1 samples are required as described with reference to FIG. 6. Therefore, the removal of the input of the sample remover 847 may be a process of removing as many as N subsequently, because only 0 to N−1 samples are required.

The antenna coupler 848 may receive the output of the power calculator 846 and calculate a sum of powers calculated for each antenna. The antenna coupler 848 may perform calculations in the same form as that of the antenna couplers 733-1, 733-2 and 733-3 described above with reference to FIG. 7B. The output of the antenna coupler 848 may be input to the delay estimator 743 as described with reference to FIG. 7C.

Expressing the interpolation method made by the 2× interpolator(0) 831 described above, and the 2× interpolator (0) 841 and the 2× interpolator(1) 842 included in the power delay ambiguity calculator 840, as an equation, it may be expressed as Equation 4 and Equation 5 as below. Equation 4 represents a processing for an even-numbered output amongst the inputs of the 2× interpolator(0) 841 and the 2× interpolator(1) 842, and Equation 5 represents a processing for an odd-numbered output in the 2× interpolator period(0) 841 and the 2× interpolator(1) 842.

$$y_{int}[2i] = x[i]/\sqrt{2} \qquad \text{[Equation 4]}$$

wherein 'I' may have a value from 0 to N−1 as described above, and 'N' is a natural number.

$$y_{int}[2i + 1] = \sum_{p=0}^{N-1} x[(i + p) \bmod (N)]w[q, p]^* \qquad \text{[Equation 5]}$$

In the above equation, 'i' may also have a value from 0 to N−1 and 'N' is a natural number. Further, 'p' is an index of summation, indicating a position of tone used for the interpolation, and 'q' has a value of 0 to 1 and is an index for two interpolators.

In Equation 5 above, w[q,p] represents a weight for the interpolation and may be calculated in the same way as in Equation 6 below.

$$wt[q, k] = \frac{1}{\sqrt{N}} FFT_{2N}[f[i]], w[q, p] \qquad \text{[Equation 6]}$$

$$= wt[q, (2N + 2p - 1) \bmod (2N)]$$

$$f[i] = \begin{cases} 1, & \text{for } i = qN \sim (q + 1)N - 1 \\ 0, & \text{otherwise} \end{cases}$$

In order to reduce the complexity of Equation 5, it may be approximated as shown in Equation 7 below, and when 'T' is 1, it uses only the weight of p=0,1, which may mean a linear interpolation.

$$y_{int}[2i + 1] \cong \sum_{p=1}^{T} x[(i + p) \bmod(N)]w[q, p]^* + \qquad \text{[Equation 7]}$$

$$\sum_{p=N+1-T}^{N} x[(i + p) \bmod(N)]w[q, (p) \bmod(N)]^*$$

$$i = 0 \sim N - 1, T < N/2, q = 0 \sim 1$$

Figure 9A:
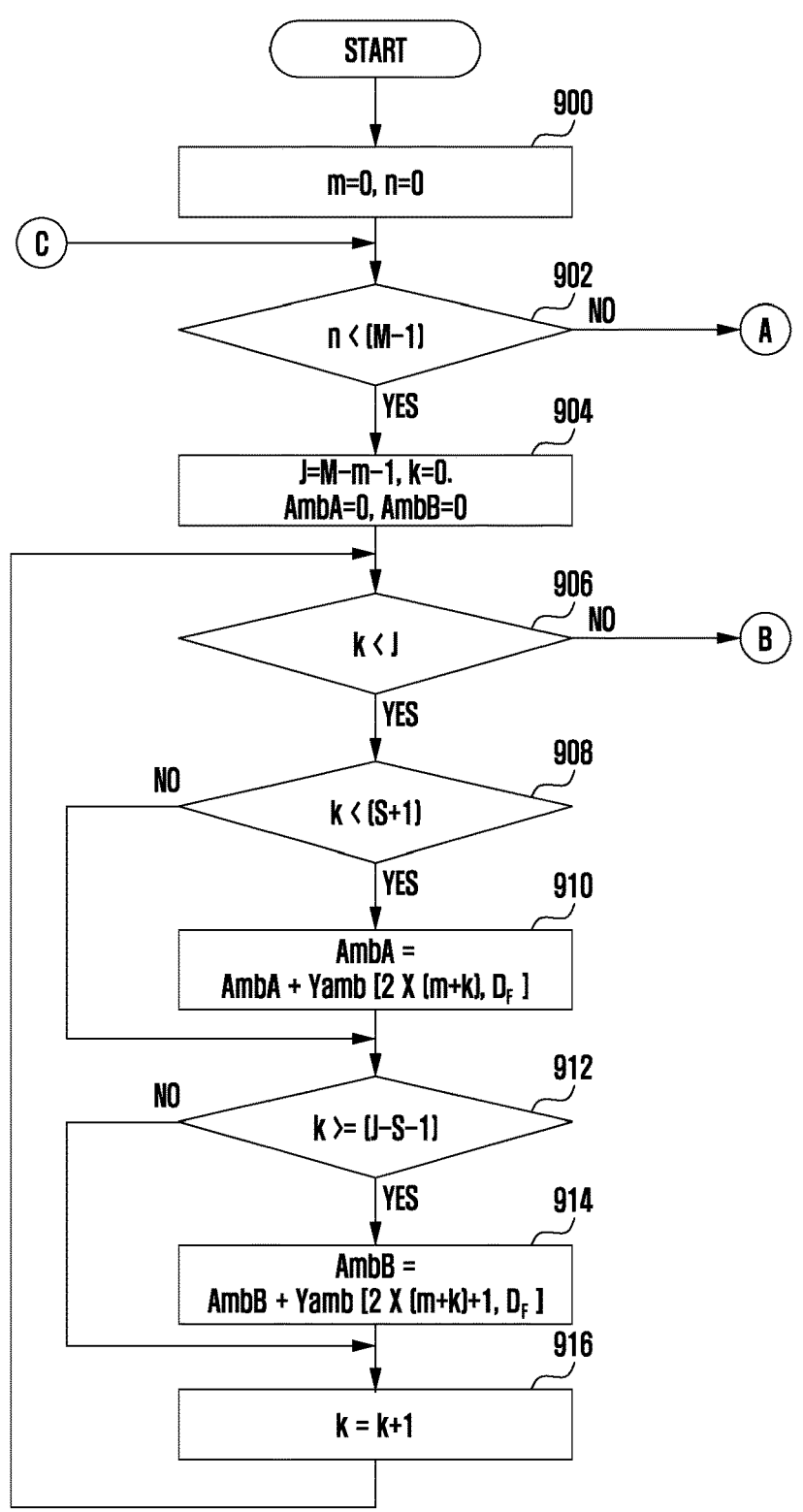
FIG. 9A is a partial view of a diagram illustrating a control flow when estimating delay in a delay estimator of a delay ambiguity detector according to an embodiment of the disclosure.
Figure 9B:
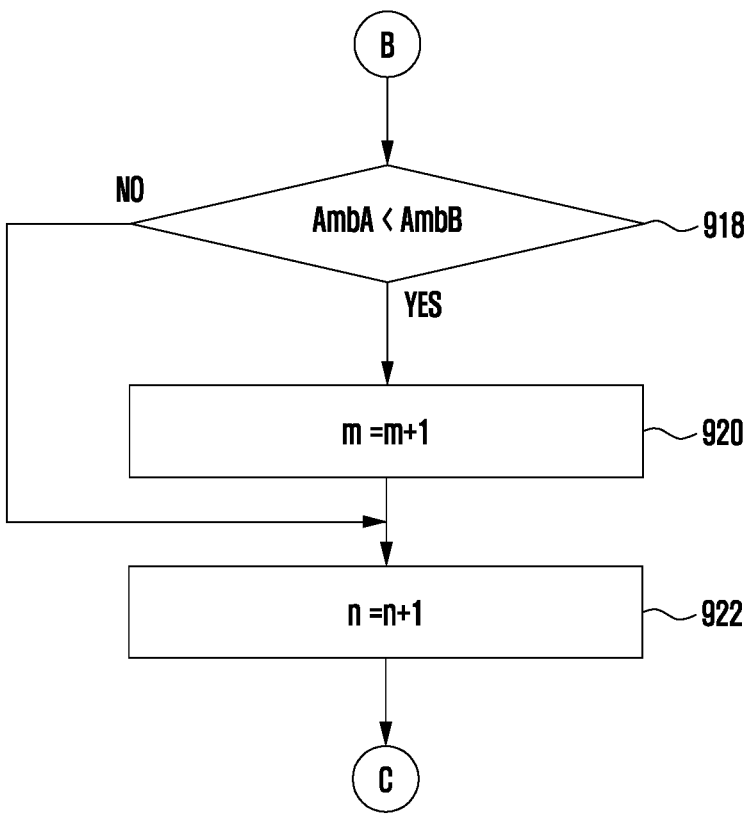
FIG. 9B is a partial view of a diagram illustrating a control flow when estimating delay in a delay estimator of a delay ambiguity detector according to an embodiment of the disclosure.
Figure 9C:
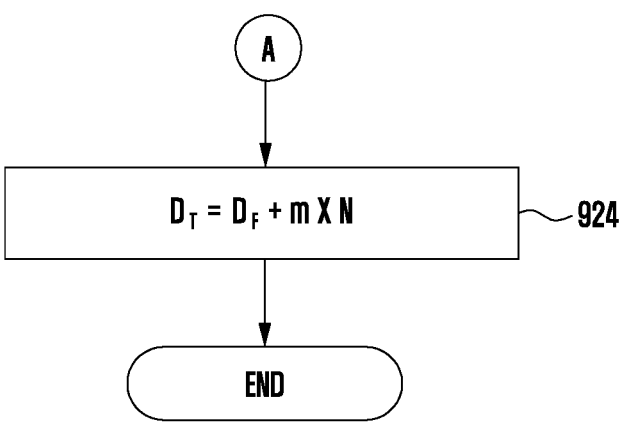
FIG. 9C is a partial view of a diagram illustrating a control flow when estimating delay in a delay estimator of a delay ambiguity detector according to an embodiment of the disclosure.

FIGS. 9A, 9B, and 9C are diagrams illustrating a control flow for estimating a delay in a delay estimator of a delay ambiguity detector according to various embodiments of the disclosure.

Hereinafter, an operation of estimating delay ambiguity performed by the delay estimator 743 will be described with reference to FIGS. 9A to 9C.

Once the delay estimation starts, the delay estimator 743 may initialize the variables 'm' and 'n' to 0 in operation 900, respectively. Here, the variables 'm' and 'n' may be variables for the base station to determine the extension of the preamble symbol delay. As described above, in the disclosure, description has been made of the methods for allowing the base station to receive a preamble symbol delayed by a length longer than one preamble symbol length. As such, the delay estimator 743 should be able to detect it even if any preamble is received being delayed by a length of two or more preamble symbols.

Accordingly, the delay estimator 743 may determine whether the value of n is smaller than M−1 in operation 902. If n is less than M−1, then the control proceeds to operation

904. If n is greater than or equal to M−1, then the control proceeds to operation 924 of FIG. 9C. Here, M may be a value for a delay of the preamble allowed by the base station. In the above description, according to the technical standard in the art, a base station is typically allowed only a delay up to one preamble symbol length. However, according to the disclosure, it is allowed to detect a delay for as long as a length of M preamble symbols, wherein 'M' is a natural number equal to or greater than 2, and thus, determining whether the value of n is smaller than the value of (M−1) is to find a symbol delay in the M symbols through (M−1) times of comparison.

If n is less than (M−1) as a result of determining in operation 902, the delay estimator 743 may set the value of J to (M−n−1) in operation 904 and initialize the variables k and both of AmbA and AmbB to 0. Here, 'J' may be a variable indicating the difference between DAsymbols in two ambiguity energies to be compared. If comparison is made between the ambiguity energies of 0 symbol delay and 4 symbol delay, then J becomes 4. According to the control flow of the disclosure, the delay estimator 743 compares the energy of 0 symbol delay with the energy (M−1) symbol delay. If the energy of 0 symbol delay is smaller than the energy of (M−1) symbol delay, the delay estimator 743 compares 1 symbol delay and M−1 symbol delay in the next step. For example, repetition may be performed by reducing the symbol delay one by one in each step. Therefore, it may be an operation of comparing x symbol delay with (x+1) symbol delay finally and selecting one larger symbol energy from among the compared energies. Further, AmbA and AmbB may be a sum of energy of symbols to be compared, as described above with reference to FIG. 7C. Further, 'k' may be a variable for adding as much as difference of DAsymbol to the currently compared two symbol delays.

In operation 900, the value of m is set to 0, so the value of J becomes M−1, and the variable k, and AmbA and AmbB may all be set to 0.

Thereafter, the delay estimator 743 may identify whether the value of k is smaller than J in operation 906. As a result of the identification in operation 906, the delay estimator 743 may proceed to operation 908 if the value of k is less than J, and proceed to operation 918 of FIG. 9B if the value of k is greater than or equal to J.

When it proceeds from operation 906 to operation 908, the delay estimator 743 may identify whether the value of k is smaller than the value of (S+1). Here, S may be the number of preamble symbols. Accordingly, the operation 908 may be an operation for identifying whether the value of k is within a preamble range. As a result of the identification in operation 908, the delay estimator 743 may proceed to operation 910 if the value of k is less than the value of (S+1), and proceed to operation 912 if the value of k is greater than or equal to the value of (S+1).

The delay estimator 743 may calculate the AmbA value as Yamb[2 X (m+k), $D_F$] in operation 910. This Yamb[2 X (m+k), $D_F$] may be an output of a specific power calculator amongst the delay ambiguity power calculators described above with reference to FIG. 7C. Further, $D_F$ is a fractional delay caused by propagation delay and multipath delay, which may be a value detected by the maximum energy detector 734.

Thereafter, the delay estimator 743 may identify whether the value of k is greater than or equal to (J−S−1) in operation 912. Such comparison is the same as described with reference to FIGS. 5 and 7C. For example, as shown in FIG. 5, it can be calculated by comparing only two different energies, that is, AmbA=DAsymbol[0,0] and AmbB=DAsymbol [1,S], when comparing the two ambiguity energies having one symbol difference.

Referring to FIG. 7C, assuming AmbA=Yamb[0,$D_F$], it may be DAsymbol[0,0] described in FIG. 5, and assuming AmbB=Yamb[1,$D_F$], it may be DAsymbol[1,S] described in FIG. 5. In comparing two ambiguity energies having two symbol difference, AmbA and AmbB may be respectively set as follows:

With AmbA=Yamb[0,$D_F$]+Yamb[2,$D_F$], it may correspond to DAsymbol[0,0]+DAsymbol[0,1] in FIG. 5.

With AmbB=Yamb[1,$D_F$]+Yamb[3,$D_F$], it may correspond to DAsymbol[2,S−1]+DAsymbol[2,S] in FIG. 5.

As a result of identification in operation 912, if the value k is greater than or equal to (J−S−1), then the delay estimator 743 may proceed to operation 914, and if the value k is less than (J−S−1), it may proceed to operation 916.

The delay estimator 743 may calculate AmbB as Yamb[2 X (m+k)+1, DF] in operation 914. Thereafter, the delay estimator 743 may increase the value of k by 1 in operation 916 and then proceed to operation 906.

Meanwhile, if the value k is greater than or equal to the value J in operation 906, then the delay estimator 743 may proceed to operation 918 of FIG. 9B. The delay estimator 743 may identify whether the value of AmbA value is less than the value of AmbB in operation 918. This operation may be a process of comparing only energies having difference between the AmbA value and the AmbB value except for a common part. If the AmbA value is smaller than the AmbB value, the control may proceed to operation 920 to increase the value of m by 1. Here, 'm' represents a symbol delay value corresponding to AmbA to be compared. In an example where M is 4, when the value of m starts at 0, it may compare 0 symbol and 3 symbol. At this time, if the energy of 3 symbols is larger, then the value m increases by 1 (m=1), and accordingly, it may compare 1 symbol and 3 symbol with each other. Assuming that 1 symbol is larger as a result of the comparison, the value m is maintained at 1 again, and it may compare 1 symbol and 2 symbol. By means of this comparison process, the value m is maintained or increased, and such an energy comparison between symbol intervals can be made based on this result.

The delay estimator 743 may increase the value of n by 1 either in operation 918 or when proceeding from operation 920 to operation 922 and then proceed to operation 902 of FIG. 9A.

On the other hand, as a result of determination in the above operation 902, when the value of n is not less than (M−1), that is, when the value of n is equal to or greater than (M−1), the control may proceed to operation 924 of FIG. 9C. In operation 924, the delay estimator 743 may set the DT value as a sum ($D_T$=m×N+DF) of the DF value and the value obtained by multiplying a delay (m) in a unit of preamble symbol by N as described above, and then complete the delay estimation.

According to the method described above, the preamble detector of the base station, that is, the PRACH detector can extend the PRACH measurement range capable of being measured by the base station from one preamble symbol range to M preamble symbol range. The method according to the disclosure can provide an advantageous effect of extending the coverage of the base station which has limited coverage of an extremely narrow range as seen in the Table 1 above. Further, the methods make it possible for the base station to predict a distance between a terminal and the base station based on the preamble received via the PRACH detector, thereby utilizing the same for data transmission/ reception. Furthermore, the base station can prevent degradation in signal performance in estimating the preamble signal.

According to an embodiment, an apparatus for detecting a preamble signal of a random access channel in a base station is provided. The apparatus includes a preamble symbol unit data generator for receiving preamble symbols for a third time interval via the random access channel for each antenna to convert the same into a preamble symbol unit, wherein the third time interval is a sum of a first time interval required for transmission of the preamble symbols forming a preamble body and a second time interval two or more preamble symbols are transmitted. The apparatus includes a first fast Fourier transformer for fast Fourier transforming each output of the preamble symbol unit data generator. The apparatus includes a first sequence generator for generating the same preamble sequence as a preamble sequence used in the preamble body. The apparatus includes a coverage extension detector configured to calculate symbol power of each of the preamble symbols using the preamble sequence with respect to the first fast Fourier-transformed symbols for each antenna, calculate a non-coherent sum for each consecutive preamble symbol corresponding to the first time interval within the power calculated preamble symbols for each antenna, combine the non-coherent sums calculated for the preamble symbols at the same position for each antenna, and detect a maximum energy value among the combined non-coherent sums and a first delay value (DF) of the preamble symbols having the maximum energy value.

The apparatus includes a delay ambiguity detector configured to calculate power using the preamble sequence for two consecutive preamble symbols in the preamble symbols received for the third time interval, and estimate a second delay value (DT) of the preamble symbols using power of the two consecutive preamble symbols. The apparatus includes a preamble determiner for determining whether a preamble is received using the second delay value and the maximum energy value.

For example, the coverage extension detector comprises symbol power calculators for calculating power of the preamble symbol for each of the symbols fast Fourier transformed by the first fast Fourier transformer for each antenna using output of the first sequence generator. The coverage extension detector comprises non-coherent sum calculators for calculating a non-coherent sum in units of consecutive preamble symbols corresponding to the first time interval within the power-calculated preamble symbols for each antenna. The coverage extension detector comprises: first antenna couplers for combining the non-coherent sum calculated for the preamble symbols at the same position for each antenna. The coverage extension detector comprises a maximum energy detector for calculating and outputting a maximum energy value among the combined non-coherent sums and a first delay value of the preamble symbols having the maximum energy value using the outputs of the first antenna couplers.

For example, each of the symbol power calculators comprises a sequence correlator for performing sequence correlation with the first fast Fourier-transformed preamble symbol using the preamble sequence. Each of the symbol power calculators comprises a first inverse fast Fourier transformer for inverse fast Fourier transforming the sequence-correlated signal. Each of the symbol power calculators comprises a first power calculator for calculating power of the first inverse fast Fourier-transformed signal.

For example, The delay ambiguity detector comprises a second sequence generator for generating a second sequence, using the output of the first sequence generator. The delay ambiguity detector comprises second power calculators for calculating power for two consecutive preamble symbols amongst the received preamble symbols, using the output of the second sequence generator. The delay ambiguity detector comprises a delay estimator for estimating the second delay value, using the first delay value and outputs of the second power calculators.

For example, the second sequence generator comprises a second inverse fast Fourier transformer for inverse fast Fourier transforming the output of the first sequence generator. The second sequence generator comprises a zero padder for outputting zero values corresponding to a length of the preamble sequence of the first sequence generator. The second sequence generator comprises a second Fast Fourier transformer for combining the output of the second inverse Fast Fourier transformer and the output of the zero padder to perform fast Fourier transform.

For example, the second power calculators comprises a third fast Fourier transformer for fast Fourier transforming the two consecutive preamble symbols at once.

The second power calculators a second sequence correlator for calculating correlation with the second fast Fourier-transformed symbol using the output of the second sequence generator. The second power calculators a third inverse Fast Fourier transformer for inverse fast Fourier transforming an output of the second sequence correlator. The second power calculators a power calculator for calculating power for one preamble symbol length from output of the third inverse fast Fourier transformer. The second power calculators a sample remover for removing a signal for which the power calculation is not performed. The second power calculators a second antenna coupler for combining power-calculated values with respect to the same preamble symbol for each antenna.

For example, the second sequence generator comprises a first interpolator for performing interpolation so that the length is doubled, using the output of the first sequence generator.

For example, each of the second power calculators comprises a second interpolator and a third interpolator for calculating to double a length of one preamble symbol for the two consecutive preamble symbols. each of the second power calculators comprises an adder for adding outputs of the second and third interpolators. Each of the second power calculators comprises a third sequence correlator for calculating correlation with an output of the adder using the output of the second sequence generator. Each of the second power calculators comprises a fourth inverse fast Fourier transformer for inverse fast Fourier transforming an output of the third sequence correlator. Each of the second power calculators comprises a power calculator for calculating power for only one preamble symbol length from an output of the fourth inverse fast Fourier transformer. Each of the second power calculators comprises a sample remover for removing a signal for which the power calculation is not performed.

Each of the second power calculators comprises a third antenna coupler for combining power-calculated values with respect to the same preamble symbol for each antenna.

For example, the preamble determiner is further configured to determine a reception position of the preamble when it is determined that the preamble has been received.

According to an embodiment, a method for detecting a preamble signal of a random access channel in a base station is provided. The method comprises receiving preamble symbols for a third time interval via the random access channel for each antenna. The third time interval is a sum of a first time interval required for transmission of the preamble symbols forming a preamble body and a second time interval two or more preamble symbols are transmitted. The method includes dividing the preamble symbols received for the third time into one preamble symbol unit. The method includes first fast Fourier transforming for fast Fourier transforming each of the divided preamble symbols respectively. The method includes generating a first preamble sequence that is the same as a preamble sequence used in the preamble body. The method includes calculating symbol power of each of the preamble symbols using the preamble sequence with respect to the first fast Fourier-transformed symbols for each antenna. The method includes calculating a non-coherent sum for consecutive preamble symbols corresponding to the first time interval within the power-calculated preamble symbols for each antenna. The method includes combining the non-coherent sums calculated for the preamble symbols at the same position for each antenna. The method includes detecting a maximum energy value amongst the non-coherent sums. The method includes generating a first delay value (DF) for the consecutive preamble symbols having the maximum energy value. The method includes calculating power using the preamble sequence for two consecutive preamble symbols in the preamble symbols received for the third time interval. The method includes estimating a second delay value (DT) of the preamble symbols using power of the two consecutive preamble symbols. The method includes determining whether a preamble is received using the second delay value and the maximum energy value.

For example, the method includes performing sequence correlation with the first fast Fourier-transformed preamble symbol using the first preamble sequence. The method includes inverse fast Fourier transforming the sequence-correlated signal. The method includes calculating power of the inverse fast Fourier-transformed signal.

For example, the method includes generating a second sequence having twice a length of the preamble sequence by using the preamble sequence. The method includes calculating second power for two consecutive preamble symbols from among the received preamble symbols using the second sequence. The method includes estimating the second delay value using the first delay value and the second power calculation values.

For example, the method includes performing an inverse fast Fourier transforming the preamble sequence. The method includes padding a zero value of the same length to the inverse fast Fourier-transformed preamble sequence. The method includes generating the inverse fast Fourier-transformed signal padded with the zero value by performing fast Fourier transform at a time.

For example, the method includes third fast Fourier transforming for fast Fourier transforming the two consecutive preamble symbols at once. The method includes second correlating for calculating correlation with the second fast Fourier-transformed symbol using the second sequence. The method includes third inverse fast Fourier transforming for inverse Fast Fourier transforming the value calculated in the second correlation. The method includes calculating power for only one preamble symbol length from the third inverse fast Fourier-transformed output. The method includes removing the signal for which the power calculation is not performed. The method includes combining the power calculated values for the same preamble symbol for each antenna.

For example, the method includes performing an interpolation so that the length is doubled using the preamble sequence.

For example, the method includes calculating a length of one preamble symbol to be doubled, for the two consecutive preamble symbols. The method includes adding the two consecutive preamble symbols with the doubled length. The method includes a third correlation for calculating correlation with the added value, using an output of the second sequence generator. The method includes a fourth inverse fast Fourier transformation for inverse fast Fourier transforming the third correlated value. The method includes calculating power for only one preamble symbol length in the fourth inverse fast Fourier-transformed signal. The method includes removing the signal for which the power calculation is not performed. The method includes combining the power calculated values for the same preamble symbol for each antenna.

For example, the method includes determining a reception position of the preamble when it is determined that the preamble has been received.

For example, the method comprises calculating, by symbol power calculators, power of the preamble symbol for each of the symbols fast Fourier transformed by the first fast Fourier transformer for each antenna using output of the first sequence generator. The method comprises calculating, by non-coherent sum calculators, a non-coherent sum in units of consecutive preamble symbols corresponding to the first time interval within the power-calculated preamble symbols for each antenna. The method comprises combining, by first antenna couplers, the non-coherent sum calculated for the preamble symbols at the same position for each antenna. The method comprises calculating, by a maximum energy detector, and outputting a maximum energy value among the combined non-coherent sums and a first delay value of the preamble symbols having the maximum energy value using the outputs of the first antenna couplers.

Further, various embodiments disclosed in the foregoing specification and drawings are merely provided as certain examples to easily explain and help better understand the contents of the disclosure, and are not intended to limit the scope of the disclosure thereto. Therefore, the scope of the disclosure should be construed as encompassing all the changes or modifications derived from the technical spirit of the disclosure in addition to the embodiments disclosed herein. For example, although the disclosure is intended to illustrate various forms in FIGS. 8A and 8B, every and all forms of the disclosure cannot be illustrated, and thus, various modifications can be made based on the same content as the spirit of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An apparatus for detecting a preamble signal of a random access channel in a base station, the apparatus comprising:

memory, comprising one or more storage media, storing instructions; and one or more processors communicatively coupled to the memory, wherein the instructions, when executed by the one or more processors individually or collectively, cause the apparatus to:

receive preamble symbols for a third time interval via the random access channel for each antenna to convert the preamble symbols into a preamble symbol unit, wherein the third time interval is a sum of a first time interval required for transmission of the preamble symbols forming a preamble body and a second time interval during which two or more preamble symbols are transmitted, perform first fast Fourier transform on symbols including the preamble symbols and the two or more preamble symbols, generate the same preamble sequence as a preamble sequence used in the preamble body, calculate symbol power of each of the preamble symbols using the preamble sequence with respect to the first fast Fourier-transformed symbols for each antenna, for each antenna, calculate a non-coherent sums by adding the calculated symbol power of each preamble symbol across all possible sequences of consecutive preamble symbols within the first time interval, combine the non-coherent sums calculated for the preamble symbols at the same position for each antenna, detect a maximum energy value among the combined non-coherent sums and a first delay value (DF) of the preamble symbols having the maximum energy value, calculate power using the preamble sequence for two consecutive preamble symbols in the preamble symbols received for the third time interval, estimate a second delay value (DT) of the preamble symbols using the power of the two consecutive preamble symbols, and determine whether a preamble is received using the second delay value and the maximum energy value.

2. The apparatus of claim 1, wherein the instructions that, when executed by the one or more processors individually or collectively, further cause the apparatus to:

calculate power for each of the first fast Fourier-transformed symbols for each antenna using the generated preamble sequence used in the preamble body;

calculate non-coherent sums in units of consecutive preamble symbols within the first time interval for each antenna;

combine the non-coherent sum calculated for the preamble symbols at the same position for each antenna by first antenna couplers; and output a maximum energy value among the combined non-coherent sums and a first delay value of the preamble symbols having the maximum energy value using an output of the first antenna couplers.

3. The apparatus of claim 2, wherein the instructions that, when executed by the one or more processors individually or collectively, further cause the apparatus to:

perform sequence correlation with the first fast Fourier-transformed symbols using the preamble sequence to generate a sequence-correlated signal;

perform first inverse fast Fourier transforming the sequence-correlated signal to generate a first inverse fast Fourier-transformed signal; and calculate power of the first inverse fast Fourier-transformed signal.

4. The apparatus of claim 1, wherein the instructions that, when executed by the one or more processors individually or collectively, further cause the apparatus to:

generate a second sequence, based on the generated preamble sequence used in the preamble body;

calculate power for two consecutive preamble symbols amongst the received preamble symbols based on the second sequence; and estimate the second delay value based on the first delay value and the calculated power for the two consecutive preamble symbols.

5. The apparatus of claim 4, wherein the instructions that, when executed by the one or more processors individually or collectively, further cause the apparatus to:

perform second inverse fast Fourier for transforming the preamble sequence used in the preamble body;

output zero values corresponding to a length of the preamble sequence used in the preamble body; and combine the second inverse Fast Fourier-transformed preamble sequence and zero values.

6. The apparatus of claim 5, wherein the instructions that, when executed by the one or more processors individually or collectively, further cause the apparatus to:

perform third fast Fourier for transforming the two consecutive preamble symbols at once;

calculate second correlation with a second fast Fourier-transformed symbol using the second sequence;

perform third inverse Fast Fourier for inverse fast Fourier transforming a value calculated in the second correlation;

calculate power for one preamble symbol length from a third inverse fast Fourier transformer output;

remove a signal for which a power calculation is not performed; and combining the calculated power for the same preamble symbol for each antenna.

7. The apparatus of claim 5, wherein the instructions that, when executed by the one or more processors individually or collectively, further cause the apparatus to:

perform interpolation so that the length is doubled using the preamble sequence.

8. The apparatus of claim 7, wherein the instructions that, when executed by the one or more processors individually or collectively, further cause the apparatus to:

calculate a length of one preamble symbol to be doubled for the two consecutive preamble symbols;

adding the two consecutive preamble symbols with the doubled length to generate a value;

calculating third correlation with the value using the second sequence to generate a third correlated value;

perform fourth inverse fast Fourier for inverse fast Fourier transforming the third correlated value to generate a fourth inverse fast Fourier-transformed signal;

calculate power for only one preamble symbol length from an output of the fourth inverse fast Fourier transformer in the fourth inverse fast Fourier-transformed signal;

remove a signal for which the power calculation is not performed; and combining the calculated power for the same preamble symbol for each antenna.

9. The apparatus of claim 1, wherein the instructions that, when executed by the one or more processors individually or collectively, further cause the apparatus to:

determine a reception position of the preamble when it is determined that the preamble has been received.

10. A method for detecting a preamble signal of a random access channel in a base station, the method comprising:

receiving preamble symbols for a third time interval via the random access channel for each antenna, wherein the third time interval is a sum of a first time interval required for transmission of the preamble symbols forming a preamble body and a second time interval during which two or more preamble symbols are transmitted;

dividing the preamble symbols received for the third time interval into one preamble symbol unit;

first fast Fourier transforming each of the divided preamble symbols respectively;

generating a first preamble sequence that is the same as a preamble sequence used in the preamble body;

calculating symbol power of each of the preamble symbols using the preamble sequence with respect to the first fast Fourier-transformed symbols for each antenna;

for each antenna, calculating non-coherent sums by adding the calculated symbol power of each preamble symbol across all possible sequences of consecutive preamble symbols within the first time interval;

combining the non-coherent sums calculated for the preamble symbols at the same position for each antenna;

detecting a maximum energy value amongst the non-coherent sums;

generating a first delay value (DF) for the consecutive preamble symbols having the maximum energy value;

calculating power using the preamble sequence for two consecutive preamble symbols in the preamble symbols received for the third time interval;

estimating a second delay value (DT) of the preamble symbols using the power of the two consecutive preamble symbols; and determining whether a preamble is received using the second delay value and the maximum energy value.

11. The method of claim 10, further comprising:

performing sequence correlation with the first fast Fourier-transformed symbols using the first preamble sequence to generate a sequence-correlated signal;

inverse fast Fourier transforming the sequence-correlated signal to generate an inverse fast Fourier-transformed signal; and calculating power of the inverse fast Fourier-transformed signal.

12. The method of claim 10, further comprising:

generating a second sequence having twice a length of the preamble sequence by using the preamble sequence;

calculating second power values for two consecutive preamble symbols from among the received preamble symbols using the second sequence; and estimating the second delay value using the first delay value and the calculated second power values.

13. The method of claim 12, further comprising:

performing an inverse fast Fourier transforming the preamble sequence;

padding a zero value of the same length to the inverse fast Fourier-transformed preamble sequence; and generating an inverse fast Fourier-transformed signal padded with the zero value by performing fast Fourier transform at a time.

14. The method of claim 13, further comprising:

third fast Fourier transforming for fast Fourier transforming the two consecutive preamble symbols at once;

second correlating for calculating correlation with a second fast Fourier-transformed symbol using the second sequence;

third inverse fast Fourier transforming for inverse Fast Fourier transforming the value calculated in the second correlation;

calculating power for only one preamble symbol length from a third inverse fast Fourier-transformed output;

removing a signal for which a power calculation is not performed; and combining the calculated power for the same preamble symbol for each antenna.

15. The method of claim 13, further comprising:

performing an interpolation so that the length is doubled using the preamble sequence.

16. The method of claim 15, further comprising:

calculating a length of one preamble symbol to be doubled, for the two consecutive preamble symbols;

adding the two consecutive preamble symbols with the doubled length to generate a value;

a third correlation for calculating correlation with the value, using the second sequence;

a fourth inverse fast Fourier transformation for inverse fast Fourier transforming the third correlated value to generate a fourth inverse fast Fourier-transformed signal;

calculating power for only one preamble symbol length in the fourth inverse fast Fourier-transformed signal;

removing a signal for which a power calculation is not performed; and combining the calculated power for the same preamble symbol for each antenna.

17. The method of claim 10, further comprising determining a reception position of the preamble when it is determined that the preamble has been received.

18. The method of claim 10, further comprising calculating, by symbol power calculators, power of each of the preamble symbols fast Fourier transformed by the first fast Fourier transformer for each antenna using the first preamble sequence;

calculating non-coherent sums in units of consecutive preamble symbols within the first time interval for each antenna;

combining, by first antenna couplers, the non-coherent sum calculated for the preamble symbols at the same position for each antenna; and calculating, by a maximum energy detector, and outputting a maximum energy value among the combined non-coherent sums and a first delay value of the preamble symbols having the maximum energy value using the outputs of the first antenna couplers.

\* \* \* \* \*